US010733534B2

(12) United States Patent
Marin et al.

(10) Patent No.: US 10,733,534 B2
(45) Date of Patent: Aug. 4, 2020

(54) DATA EVALUATION AS A SERVICE

(71) Applicant: Microsoft Technology Licensing, LLC, Redmond, WA (US)

(72) Inventors: Adrian Marius Marin, Bellevue, WA (US); Jayadev Pillai, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 642 days.

(21) Appl. No.: 15/593,415

(22) Filed: May 12, 2017

(65) Prior Publication Data

US 2018/0018585 A1 Jan. 18, 2018

Related U.S. Application Data

(60) Provisional application No. 62/363,201, filed on Jul. 15, 2016.

(51) Int. Cl.
*G06N 20/00* (2019.01)
(52) U.S. Cl.
CPC ................... *G06N 20/00* (2019.01)
(58) Field of Classification Search
None
See application file for complete search history.

(56) References Cited

U.S. PATENT DOCUMENTS

| 9,336,494 | B1* | 5/2016 | Purpura | G06N 20/00 |
| 2009/0106178 | A1* | 4/2009 | Chu | G06N 20/00 |
| | | | | 706/14 |
| 2016/0110657 | A1* | 4/2016 | Gibiansky | G06N 20/00 |
| | | | | 706/12 |

FOREIGN PATENT DOCUMENTS

WO  2012/151198 A1  11/2012

OTHER PUBLICATIONS

Ueda, "Optimal Linear Combination of Neural Networks for Improving Classification Performance", Feb. 2000, Machine Intelligence, vol. 22 No. 2, pp. 207-215. (Year: 2000).*

(Continued)

*Primary Examiner* — Paulinho E Smith
(74) *Attorney, Agent, or Firm* — Buckley, Maschoff & Talwalkar LLC

(57) ABSTRACT

An evaluation platform receives a data set and a description of an outcome, such as predicting results of trends, recognizing patterns, and evaluating options according to specified criteria. The description is evaluated to select candidate evaluators that may be capable of achieving the outcome, and to translate the outcome into a goal for each selected candidate evaluator. The evaluator candidate set is trained using a training data set, and an initial evaluator is selected that exhibits the highest performance to achieve the outcome over the data set. The initial evaluator is applied to achieve the requested outcome over the data set. Optionally, the performance of the initial evaluator may be monitored to detect performance drift. In this event, the evaluator candidate set is reevaluated to identify a substitute evaluator exhibiting higher performance than the initial evaluator, which replaces the initial evaluator in the continued evaluation of the data set.

20 Claims, 10 Drawing Sheets

(56) References Cited

OTHER PUBLICATIONS

Int. Search Report/Written Opinion cited in PCT Application No. PCT/US20147/042313 dated Sep. 25, 2017, 17 pgs.
"Optimal Linear Combination of Neural Networks for Improving Classification Performance", 2000, Naonori Ueda, IEEE Transactions on Pattern Analysis and Machine Intelligence, vol. 22, Issue 2, Feb. 2000, pp. 207-215.

* cited by examiner

DATA EVALUATION AS A SERVICE

CROSS-REFERENCE TO RELATED APPLICATIONS

This application claims priority under 35 U.S.C. § 119(e) to Provisional U.S. Patent Application No. 62/363,201, entitled "DATA EVALUATION AS A SERVICE," filed on Jul. 15, 2016, the entirety of which is hereby incorporated by reference as if fully rewritten herein.

BACKGROUND

Within the field of computing, many scenarios involve the application of evaluation techniques to a data set in pursuit of a goal. For example, the evaluation techniques may comprise machine learning models, such as artificial neural networks, statistical classifiers, genetically generated processes, and adaptive finite state machines that, when applied to a data set, perform various types of evaluation on the data set, such as classifying data units into similar classes; ranking the respective data units of the data set; identifying patterns arising within the data set; and performing a search over the data set.

In many such scenarios, the evaluation of the data set is performed by a designer who chooses a suitable evaluator and configures it in a manner that is suitable for the data set and the goal. The designer may apply a training routine to the evaluator with a training data set that reflects the goal (e.g., a set of inputs with known-correct outputs), and may iteratively train the evaluator until the evaluator is capable of achieving the goal over the provided training data within a desired degree of confidence. After verifying the suitability of the evaluator, the designer may apply the evaluator to the data set (e.g., in a production environment where the correct output for various input is occasionally unknown), and may take the evaluation results of the evaluator as output that expresses the goal over the data set. In this manner, an evaluator may be designed to produce desired results over a data set, even for data for which the correct output values are unknown and/or difficult for humans to evaluate and choose output values in a consistent manner.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the application of a trained evaluator to a data set may provide various advantages, several difficulties may arise in the configuration thereof. As a first such example, the number, types, capabilities, and complexities of evaluators that are applicable to a particular data set and goal may be extensive, and new and improved evaluators are being developed at a rapid pace. It may be difficult to evaluate all of the possible evaluators that may be applied in a particular scenario, and to choose the evaluator that produces the strongest results. It may also be difficult to translate the outcome that the user wishes to achieve into a goal state for each of the evaluators, as distinctions in the techniques provided by different evaluators may involve a different characterization of the goal according to the particular parameters of each evaluator. As a second such example, the configuration, training, and testing of the evaluators may be a lengthy and delicate process, wherein various design choices in the formulation and training of the evaluators (e.g., the selection and interconnection of layers and neurons in an artificial neural network) may produce significantly different results. This process may impose a significant toll on the development of an evaluation technique for a particular data set. Moreover, the design of the training process may represent a tradeoff between producing a less efficient evaluator faster, and exhaustive training and testing that produces potentially sophisticated evaluators but through an inefficient and protracted process. As a third such example, a trained evaluator may initially test to an acceptable level and may initially produce acceptable evaluation results; but at a later time (e.g., due to continued training of the evaluator and/or the application of the evaluator to new data), the evaluator may exhibit "drift," in the form of diminished performance that falls below an acceptable threshold. Detecting drift and taking ameliorative action may impose an added toll on the evaluation of the data set, and the failure to do so may result in inconsistent or incorrect evaluation results, which may be difficult to detect on a production data set for which desirable outputs are not known.

Presented herein are techniques for providing data evaluation as a service, wherein a variety of evaluation techniques may be applied to a data set of a data provider in furtherance of a goal. In accordance with these techniques, a set of evaluators may be generators that are suitable for various goals, such as various types of artificial neural networks; statistical classifiers; genetically generated processes; and adaptive finite state machines. A user provides a description of an outcome to be reached over a data set, such as predicting a result of a trend, recognizing a pattern represented by a set of characteristics, and an evaluation of options to identify one that most closely matches some criteria. The description of the outcome may be evaluated to select two or more candidate evaluators that may be capable of achieving the outcome over the data set, and to translate the requested outcome into a goal for each selected candidate evaluator. The selected candidate evaluators, a competitive training and testing process may be performed over the evaluators of the evaluator candidate set, and the performance of the trained evaluators may be compared to identify an initial evaluator. The initial evaluator is then applied to the data set to produce evaluation results for the data provider, and in some cases, may be placed into continuous use to achieve the outcome specified by the data provider over a continuous stream of data.

In some embodiments, the performance of the evaluator over the data set may further be monitored and compared with the goal to detect the presence of "drift" (e.g., verifying that the initial evaluator continues to produce correct output for the training data set, and/or comparing the evaluation results over the data set with the training data set to verify that similar input items produce consistent output from the evaluator). If a performance drift is detected, the evaluator candidate set may be reevaluated to compare the initial evaluator with the other evaluators selected as candidates. If a second evaluator is identified that exhibits higher performance than the initial evaluator, the second evaluator may be selected as a substitute evaluator, and may replace the initial evaluator in the evaluation of the data set. In this manner, a data evaluation service may be performed on behalf of a data provider in a robust and adaptive manner in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
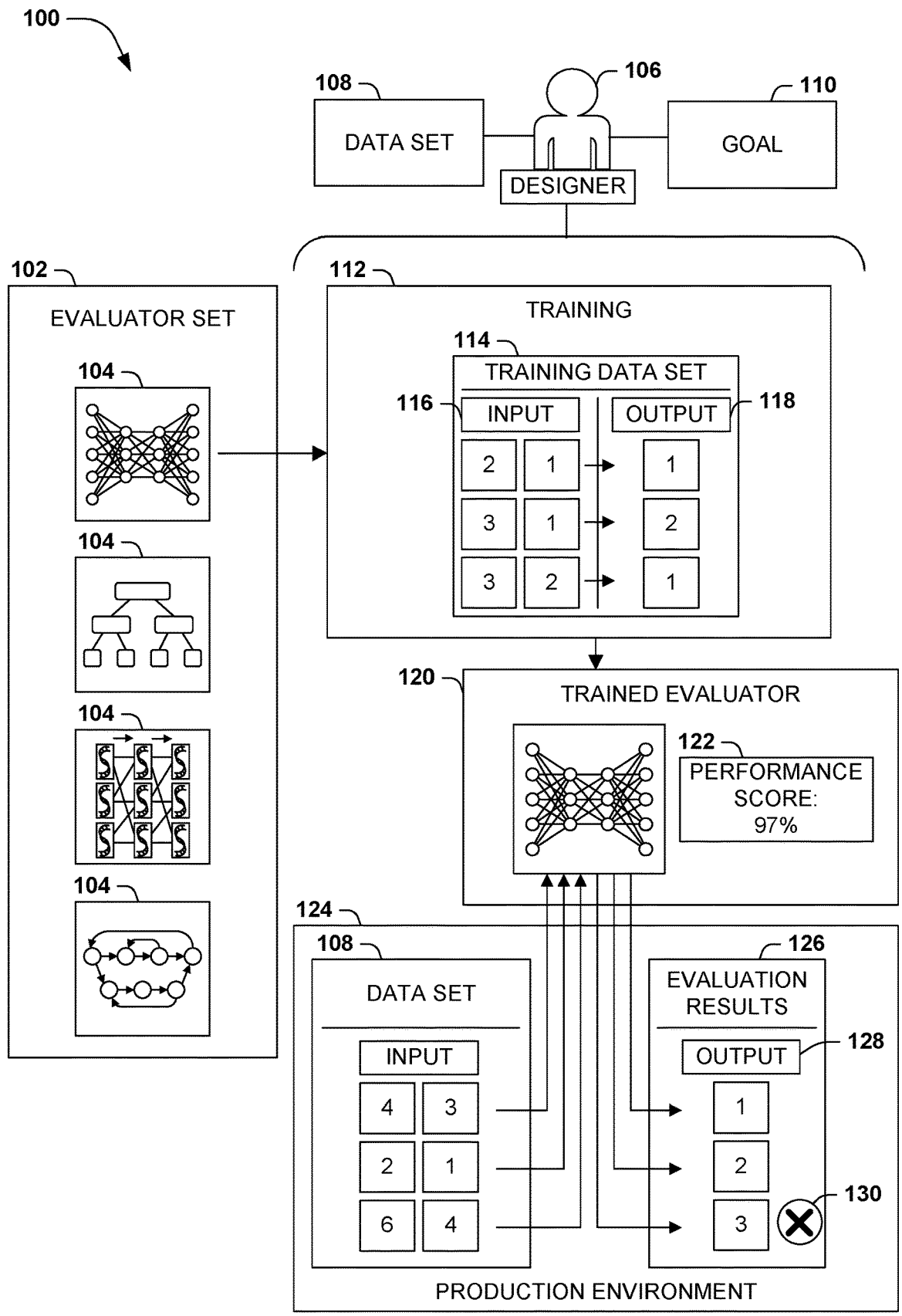
FIG. 1 is an illustration of an example scenario featuring an evaluation of a data set using an evaluator.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring the use of an evaluator set 102 of evaluators 104 an evaluation of a data set 108, such as machine learning models that adapt to fit desired sets of output for corresponding sets of input.

In this example scenario 100, a designer 106 chooses a data set 108 and identifies a goal 110 of an evaluation, such as a regression analysis applied to the data set 108; a statistical classification of various data units of the data set 108; a detection of patterns within the data set 108; and a search within the data set 108 for a selected data subset. In order to achieve the goal 110, the designer 106 may select an evaluator 104 of the evaluator set 102, such as an artificial neural network; a statistical classifier, such as a Bayesian classifier; a genetically generated process; and/or an adaptive finite state machine. Each evaluator 104 may exhibit various evaluative capabilities; e.g., a classification goal 110 may be achieved by a Bayesian classifier and/or a back-propagation-type artificial neural network; a pattern detection may be achieved by a Hopfield-type artificial neural network; and a search may be performed by a generically generated process or an adaptive finite state machine. The designer 106 may submit the selected evaluator 104 to a training process 112, involving the provision of a training data set 114 with a set of input 116 that are mapped to correct output 118 according to the goal 110 of the evaluation of the data set 108. The training process 112 may incrementally adjust the parameters of the selected evaluator 104 (e.g., adjusting the weights connecting the neurons of an artificial neural network; identifying statistical correlations among data items to be classified together; choosing pairs of processes to anneal to form a new generation of processes; and/or reconfiguring states and transitions of a finite state machine) until the selected evaluator 104 is capable of successfully identifying the output 118 for the provided inputs 116 of the training data set 114 within a desired degree of confidence. The trained evaluator 120 may exhibit a performance score 122, which the designer 106 may verify (e.g., by testing the trained evaluator 120 against additional input 116 that was not included in the training data set 114, and verifying that the trained evaluator 120 produces the correct output 118). If testing succeeds, the designer 106 may apply the trained evaluator 120 in a production environment 124 to the data set 108, and may adopt the output 128 as the evaluation results 126 that satisfy the goal 110 over the data set 108. In this manner, the designer 106 may utilize an evaluator 104 of the evaluator set 102 to perform an evaluation of the data set 108 in furtherance of the specified goal 110 of the evaluation.

However, the techniques illustrated in the example scenario 100 of FIG. 1 may present some difficulties in the development of the evaluation process over the data set 108.

As a first such example, the consideration and comparison of evaluators 104 for application to a particular data set 108 may be difficult for many users. The uses and capabilities of the evaluators 104 may differ in subtle and non-intuitive ways, and understanding the distinctions and proper uses thereof may entail significant research and experimentation, including trial-and-error application to the training process 112 and the data set 108. Moreover, because the field of machine learning is an area of extensive research and exploration, the set of evaluators 104 that may be applied to any particular data set 108 may be extensive, where new and improved models of evaluators 104 are frequently devised that may be suitable to various data sets 108 and goals 110. As a result, the selected evaluator 104 that the designer 106 believes to be suitable for a particular data set 108 may end up being unsuitable, while an alternative evaluator 104 of which the designer 106 was not aware, or which the designer 106 did not appreciate as well-suited to the goal 110, may remain untried.

As a second such example, the process of training 212, testing, and applying an evaluator 104 may involve a significant amount of development, including the development of the training data set 114, and a potentially extensive, and potentially frustrating, training process 112. For example, many evaluators 104 present a large number of parameters that may be varied to achieve different results; e.g., an artificial neural network may be devised with a variable number of layers, a variable number of neurons in each layer, and a variable configuration of the interconnections among layers. Small differences in the configuration of the respective evaluators 104 may produce significant results in the evaluation performed thereby, and such configuration may involve extensive trial-and-error in the form of tweaking the parameters of the evaluator 104 and reinitiating the training process 112. Moreover, the training process 112 may be extensive, particularly if the training data set 114 is large or complicated. If the selected evaluator 104 does not steadily converge on desired results in an efficient manner the designer 106 may be compelled to choose between accepting a less sophisticated evaluator 104 that produces output 118 with a lower degree of confidence; continuing to seek a more sophisticated evaluator 104 by continuing the training process 112 for an extended period, possibly without productive results; and/or reinitiating the training process 112 with a different configuration of the evaluator 104, or with an entirely different evaluator 104. Significant computational resources may be expended without arriving at an acceptable evaluator 104 and without a clear indication of when, or whether, an acceptable evaluator 104 may be produced for the data set 108 and the goal 110. These efforts may be costly to the development and/or analysis of the data set 108.

As a third such example, a trained evaluator 120 that passes the training 212 and is verified via testing may nevertheless produce poor results in the production environment 124, either promptly (e.g., if the data set 108 is not well-modeled by the training data set 114) or after an extended period (e.g., if new data is submitted that the trained evaluator 120 has not previously encountered and that was not included in the training data set 114, and for which the trained evaluator 120 has not been adapted; or if a continuation of the training process 112 causes the trained evaluator 120 to exhibit diminished performance in some areas, e.g., if the training data set 114 is supplemented with new data that is inconsistent with the previously included data). For these and other reasons, the trained evaluator 120 may exhibit a performance "drift" 130, where the performance of the trained evaluator 120 diverges from expected and consistent output over time. In some cases, the drift 130 may be so significant that the updated trained evaluator 120 may not have failed the initial training 212 and/or testing. The problem of drift 130 may be exacerbated if the data set 108 includes input 116 for which correct output 128 is not known. For example, a classification goal 110 may be applied to a training data set 114 comprising, as input 116, units that are well-suited and clearly associated with particular classifications. However, the actual data set 108 may include input 116 that is ambiguous, such as not clearly falling within any such classification. As the trained evaluator 120 strives to perform the evaluation of such ambiguous input 116 of the data set 108, the criteria by which the evaluator 104 classifies various input 116 may become incorrect, inconsistent, or incoherent. However, if such input 116 is not identified as having specific correct output 118, it may be difficult to identify individual instances of the output 128 of the trained evaluator 120 as incorrect and symptomatic of drift 130. Such inconsistencies may only be discovered at a later time when a significant volume of anomalous output 128 has accumulated, demonstrating the existence of a logical flaw in the trained evaluator 214. Many such problems may arise in the selection, training, and application of trained evaluators 120 as provided in the example scenario 100 of FIG. 1.

B. Presented Techniques

Presented herein are techniques for providing data evaluation as a service to achieve a goal 110 over a data set 108 (e.g., classification, ranking, searching, and/or pattern matching).

Figure 2:
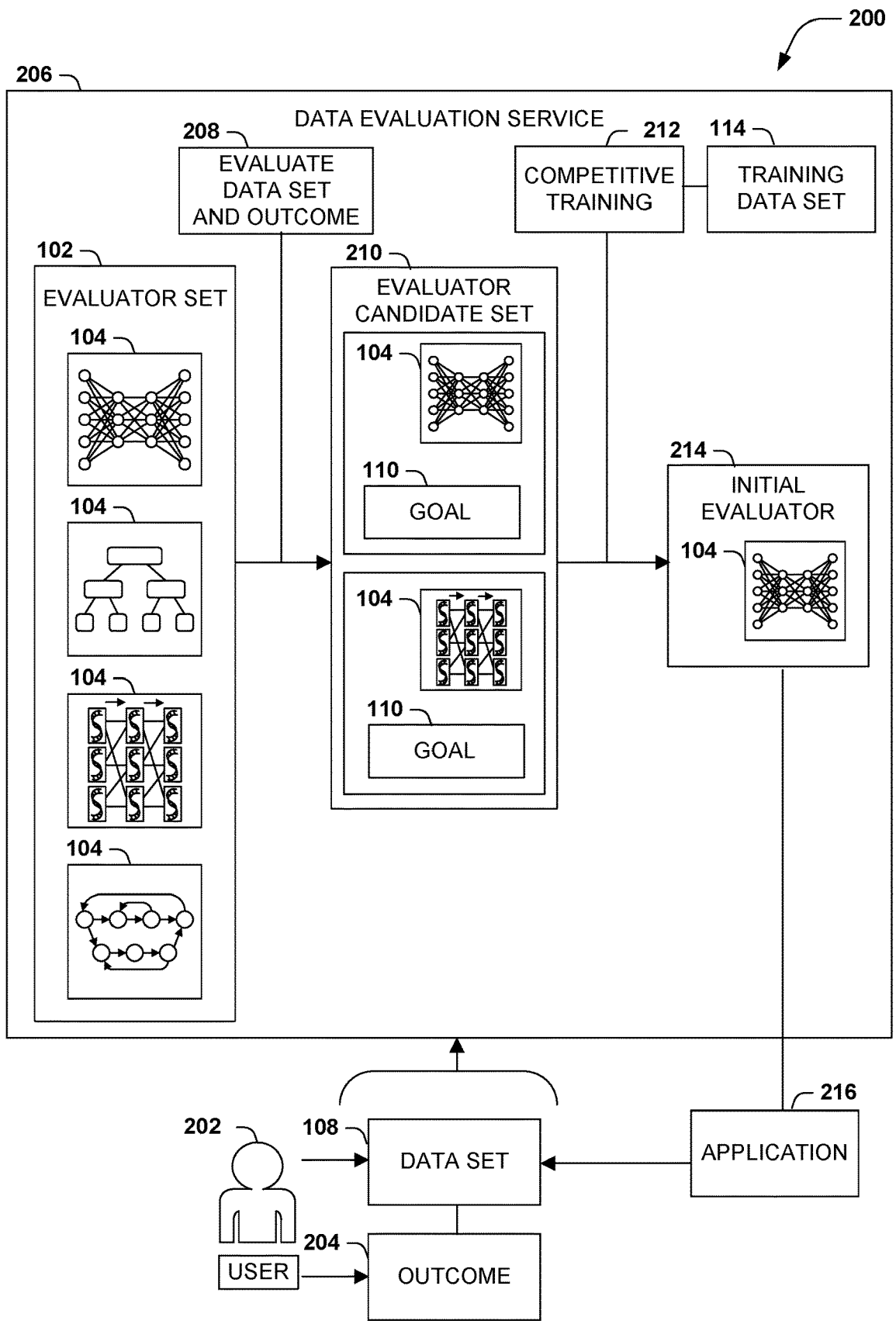
FIG. 2 is an illustration of an example scenario featuring an application of a goal over a data set using a set of evaluators, in accordance with the techniques presented herein.

FIG. 2 is an illustration of an example scenario 200 featuring a data evaluation service 206 that comprises an evaluator set 102 of evaluators 104 that are respectively capable of performing various goals 110. A user 202 presents a data set 108 and an outcome 204 that the user 202 desires to achieve, such as predicting the result of a trend in the data set 108; recognizing patterns in the data set 108, such as known patterns that the user 202 wishes to be recognized automatically, or unknown patterns that the user 202 wishes to find; and an evaluation of options to identify one that most closely matches some criteria. To fulfill the request of the user 202 to achieve the outcome 204 over the data set 108, the data evaluation service 206 performs an evaluation 208 over the data set 108 and the desired outcome 204 in order to choose, from the evaluator set 102, an evaluator candidate set 210 of evaluators 104 that may be capable of achieving the outcome 204. The evaluator set 102 also translates the outcome 204 into a goal 110 for evaluator 104 of the evaluator candidate set 210 (e.g., an end state of a state search that is achieved when the outcome 204 is met for the data set 108; an output of an artificial neural network that correctly identifies a pattern in the data set 108; and/or a score or confidence of a classification that is achieved by a Bayesian statistical classifier or expert system).

For the evaluator candidate set 210, the data evaluation service 206 may initiate a competitive training 212 over the evaluator candidate set 210 using a training data set 114, such as concurrently and/or consecutively training the individual evaluators 104 and assessing a performance thereof, such as the rate of convergence upon the training data set 114, and/or a precision, consistency, recall, and/or confidence of the results of the evaluators 104 during and/or upon completion of the training 212. For the evaluators 104 of the evaluator candidate set 210, performance scores may be measured that reflect the proficiency of each evaluator 104 in achieving its goal 110 over the training data set 114. From the evaluator candidate set 210, the data evaluation service 206 may select an initial evaluator 214 that exhibits the highest performance score. The data evaluation service 206 may then perform an application 216 of the initial evaluator 214 to the data set 108 in order to achieve the outcome 204 requested by the user 202. In this manner, the data evaluation service 206 achieved the outcome 204 requested by the user 202 using the evaluator set 102 in accordance with the techniques presented herein.

C. Technical Effects

Various uses of the techniques presented herein for may result in a variety of technical effects.

A first technical effect that may be achievable according to the techniques presented herein involves the provision of a data evaluation service 206 that is capable of achieving an outcome 204 over a data set 108. The evaluator set 102 may comprise a large and possibly dynamic number and variety of evaluators 104 that are well-suited for different goals 110 over different types of data sets 108. The evaluation of the data set 108 and outcome 204 by the data evaluation service 206 may contain a significant number of evaluators 104, and the evaluator set 102 may be frequently updated with new and improved evaluators 104 exhibiting distinct types of proficiency at pursuing various goals 110 over various data sets 108. For many users 202, choosing an evaluator 104 that is well-suited for achieving a particular outcome 204, translating the outcome 204 into the goal 110 for the selected evaluator 104, and training the evaluator 104 to a point where it correctly and efficiently achieves the outcome 204 may be difficult. The presentation of the data evaluation service 206 as an interface that accepts a data set 108 and an outcome 204, as well as a training data set 114 that specifies the goal 110, and the provision of evaluation results 126 therefor, provides data evaluation as a service, where users are not required to participate in the mechanics and details of such evaluation. In some embodiments, the interface is exposed to users 202 at varying levels of detail and/or abstraction, such that a more knowledgeable user 202 may participate in the selection and application of the evaluators 104, while a less interested user 202 may simply choose basic selections of the type of evaluation to be performed (e.g., naïve classification using default configuration values) and may achieve satisfactory evaluation results 126 without further participating in the evaluation process.

A second technical effect that may be achievable according to the techniques presented herein involves the scalability of the training process. On the one hand, the representation of the evaluator set as a potentially numerous, diverse, dynamic, and/or "pluggable" architecture may enable the evaluation of a large number of evaluators 104 for a particular data set 108 and goal 110, which may generalize the suitability of the data evaluation service 206 to a wide variety of data sets 108 and/or goals 110, and may skillfully and efficiently produce a well-trained evaluator 104 therefor. On the other hand, the training process may be streamlined to reduce the inefficient and unhelpful training (e.g., early elimination of evaluators 104 that are not steadily converging on the training data set 114). Additionally, the architecture of the data evaluation service 206 may promote the scalability of the evaluation process; e.g., during training, different evaluators 104 may trained against the data set 108 by different devices, each of which may compare results upon concluding training. The balance of these considerations may yield a data evaluation service 206 that identifies a proficient technique for evaluation 208 of a data set 108 in an expedient and scalable manner.

A third technical effect that may be achievable according to the techniques presented herein involves the application of the evaluation and selection process to a diverse evaluator candidate set 210. In some circumstances, the evaluator candidate set 210 may include evaluators 104 that are not typically applied to address a particular problem. The automated evaluation of a comprehensive evaluator set 102 may therefore result in the selection of an initial evaluator 214 from the evaluator candidate set 210 that may have been considered unlikely or improbable to be the most accurate evaluator 102 at achieving the goal 110 based only on the data set 108. Performing the competitive training 212 may therefore yield an initial evaluator 214 that is more proficient than any of the evaluators 104 that may otherwise have been selected for achieving the outcome 204 over the data set 108.

Figure 3:
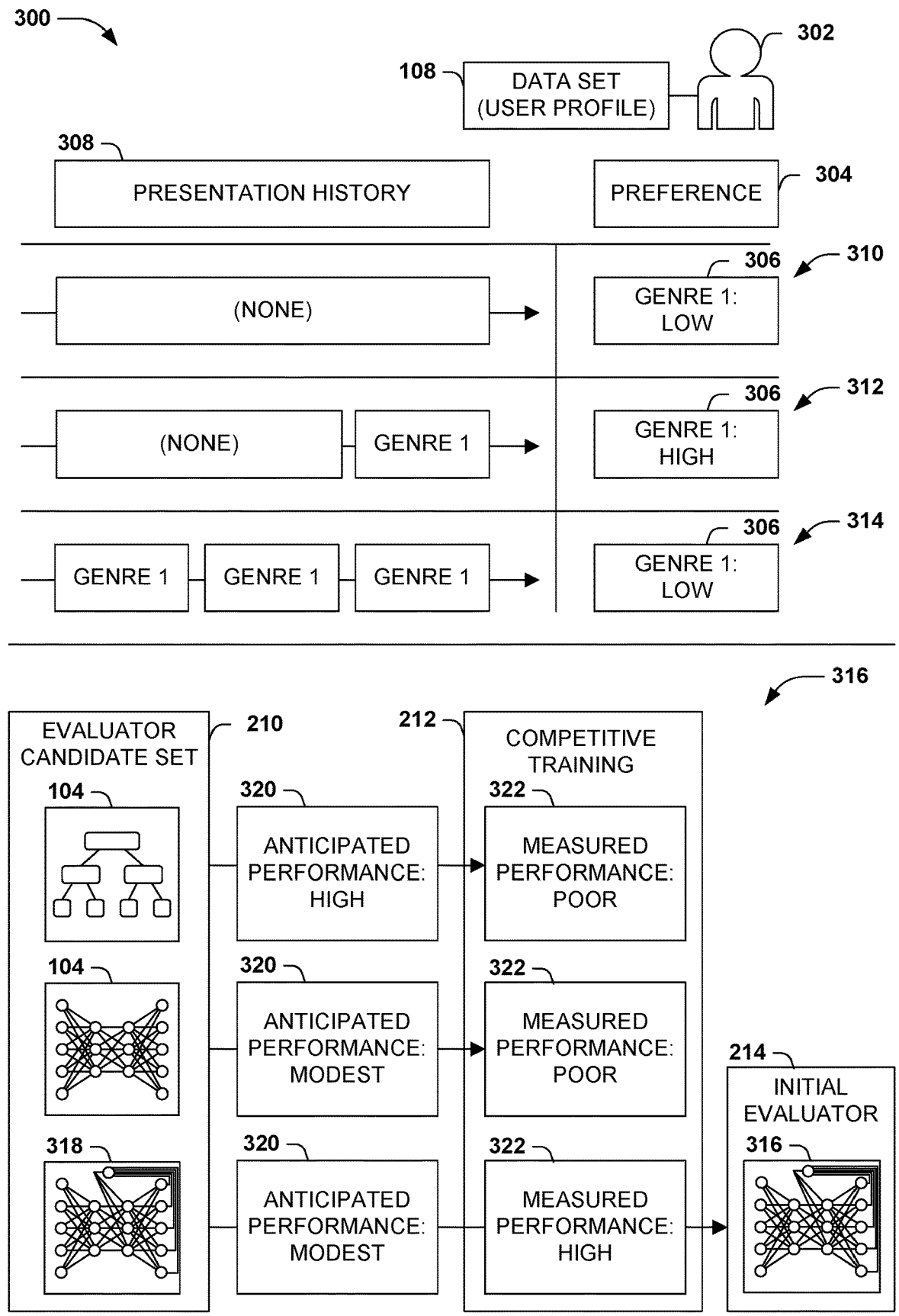
FIG. 3 is an illustration of an example scenario featuring a training process of an evaluator candidate set involving a classification of a data set, in accordance with the techniques presented herein.

FIG. 3 is an illustration of an example scenario 300 featuring one such selection process in the context of selecting a recommendation for a content genre, such as a streaming music recommendation service that presents music to a user 302 in anticipation of the user's musical interests. In this example scenario 300, a user's musical preferences may be inferred from a data set 108 comprising a user profile, such as the user's demographics and history of media purchases, and a prediction about the preferences 302 of the user for a particular musical genre may inform a stream compositor that chooses additional music for the user's content stream. However, one feature that may significantly affect the user's preference 304, and that may not be apparent from the data set 108, is the immediately preceding presentation history 308 of selections in the user's content stream. For example, at a first time 310 when the user 302 first accesses the content stream, the user 302 may exhibit a low preference 306 for a particular genre. However, at a second time 312, after the user 302 has been presented with a selection from the genre, the user 302 may exhibit a high preference 306 for the genre, and may be receptive to receiving additional selections from the genre in the content stream. Additionally, at a third time 312, after the user 302 has been exposed to a significant sequence of selections from the genre in the presentation history 308, the user 302 may reach a saturation point, and the preference 306 of the user 302 in receiving additional selections from the genre may be diminished.

The task presented in the example scenario 300 of FIG. 3 is a typical classification exercise, with the goal 110 of presenting to the user 106 a content stream of selections that the user 106 appreciates. Based on the nature of the goal 110, an anticipated performance 320 of the respective evaluators 104 of the evaluator candidate set 210 may initially place a Bayesian classification technique as likely to exhibit the most accurate predictions, as it is well-adapted to the task of classification. However, the measured performance 322 may be quite poor if the Bayesian network operates only on the data set 108, which reflects only the user profile, and not necessarily the presentation history 308; i.e., the Bayesian network may classify each possible selection without regard to previous selections, and may therefore fail to account for the relevance of the presentation history 308 to the user's preference 304. A second candidate evaluator 104 comprising a typical artificial neural network may also produce a measured performance 322 that is below even a modest anticipated performance 320, as it also fails to account for the relevance of the presentation history 308 to the user's preference 304. However, a third candidate evaluator 104 included in the evaluator candidate set 210 may comprise a recurrent or reentrant artificial neural network 318, which provides results based, in part, on the output of immediately preceding prior inputs. The structure of the recurrent or reentrant artificial neural network 318 may enable each prediction of the user's preference 304 to account for the sequence of preceding inputs to the artificial neural network 318, and may therefore exhibit a measured performance 322 that is significantly higher than its anticipated performance 320, which may prompt its selection as the initial evaluator 214 for the data set 108. In this manner, the training of the evaluator candidate set 210 based on the translation of a goal 110 to an evaluator candidate set 210 comprising a variety of evaluators 104, each having the outcome 204 translated into a goal 110 that is appropriate to the evaluator 104 for the outcome 204, may enable the selection of a more proficient initial evaluator 214 for the data set 108 than may be achieved through an evaluation of the data set 108 and a selection based on the anticipated performances 320 of the respective candidate evaluators 104, in accordance with the techniques presented herein.

A fourth technical effect that may be achievable according to the techniques presented herein involves the responsiveness of the data evaluation service 206 to performance drift 130. For example, the same architecture that involves training the evaluator candidate set 210 may be reused as a reevaluation of the remaining evaluators 104 in case the initial evaluator 214 exhibits drift 130. Moreover, the results of the competitive training of various evaluators 104 in order to identify the initial evaluator 214 may be used as part of the monitoring (e.g., comparing the actual performance of the initial evaluator 214 against the theoretical performance of the other evaluators 104 of the evaluator candidate set 210), and/or may enable a rapid response to the detection of drift 130 (e.g., the results of the competitive evaluation of the evaluator candidate set 210 may be store, such that if the initial evaluator 214 is detected as providing very poor results, a substitute evaluator that has already been completely trained on the training data set 114 is readily available to replace the initial evaluator 214). Many such technical effects may be achievable by the application of an evaluator set 102 to a data set 108 in accordance with the techniques presented herein.

D. Example Embodiments

Figure 4:
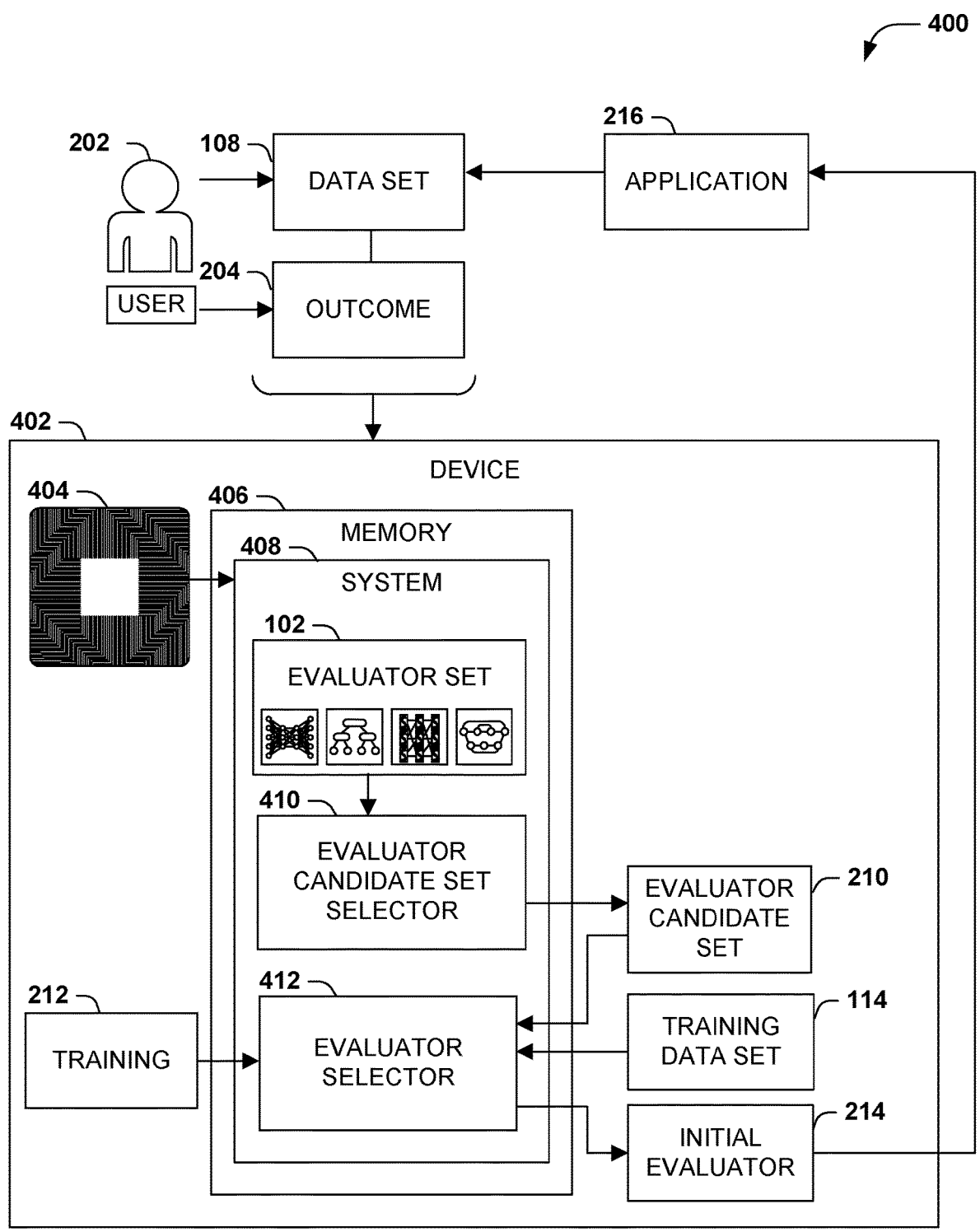
FIG. 4 is an example scenario featuring an example device and system that apply a goal over a data set using a set of evaluators, in accordance with the techniques presented herein.

FIG. 4 presents an illustration of an example scenario 400 featuring an example embodiment of the techniques presented herein, illustrated as an example device 402 that in accordance with the techniques presented herein. In this example scenario 400, the device 402 comprises a processor 404 and a memory 406 storing instructions that, when executed by the processor 404, implement an example system 408 that operates according to the techniques presented herein.

The example system 408 comprises an evaluator set 102 of evaluators 104 that are capable of fulfilling various goals 110 over various types of data sets 108. The example system 408 further comprises an evaluator selector candidate set 210, which, from the evaluator set 102, chooses an evaluator candidate set 210 of evaluators 104 that may be capable of achieving the outcome 204 over the data set 108. The evaluator candidate selector 410 also translates the outcome 204 into a goal 110 for the respective evaluators 104. The example system 408 further comprises an evaluator selector 410, which performs a training 212 of the evaluators 104 of the evaluator candidate set 210 using a training data set 114, and measures a performance score 122 for the respective evaluators 104. The evaluator selector 410 further identifies, from the evaluator candidate set 210, an initial evaluator 214 that exhibits a highest performance score 122. The example system 408 further comprises an evaluator selector 412, which performs an application 216 of the initial evaluator 214 to the data set 108. The evaluator selector 412 further monitors a performance of the initial evaluator 214 compared with the goal 110. In this manner, the interoperation of the components of the example system 408 causes the example device 402 to apply the evaluator set 102 to achieve the outcome 204 over the data set 108 in accordance with the techniques presented herein.

Figure 5:
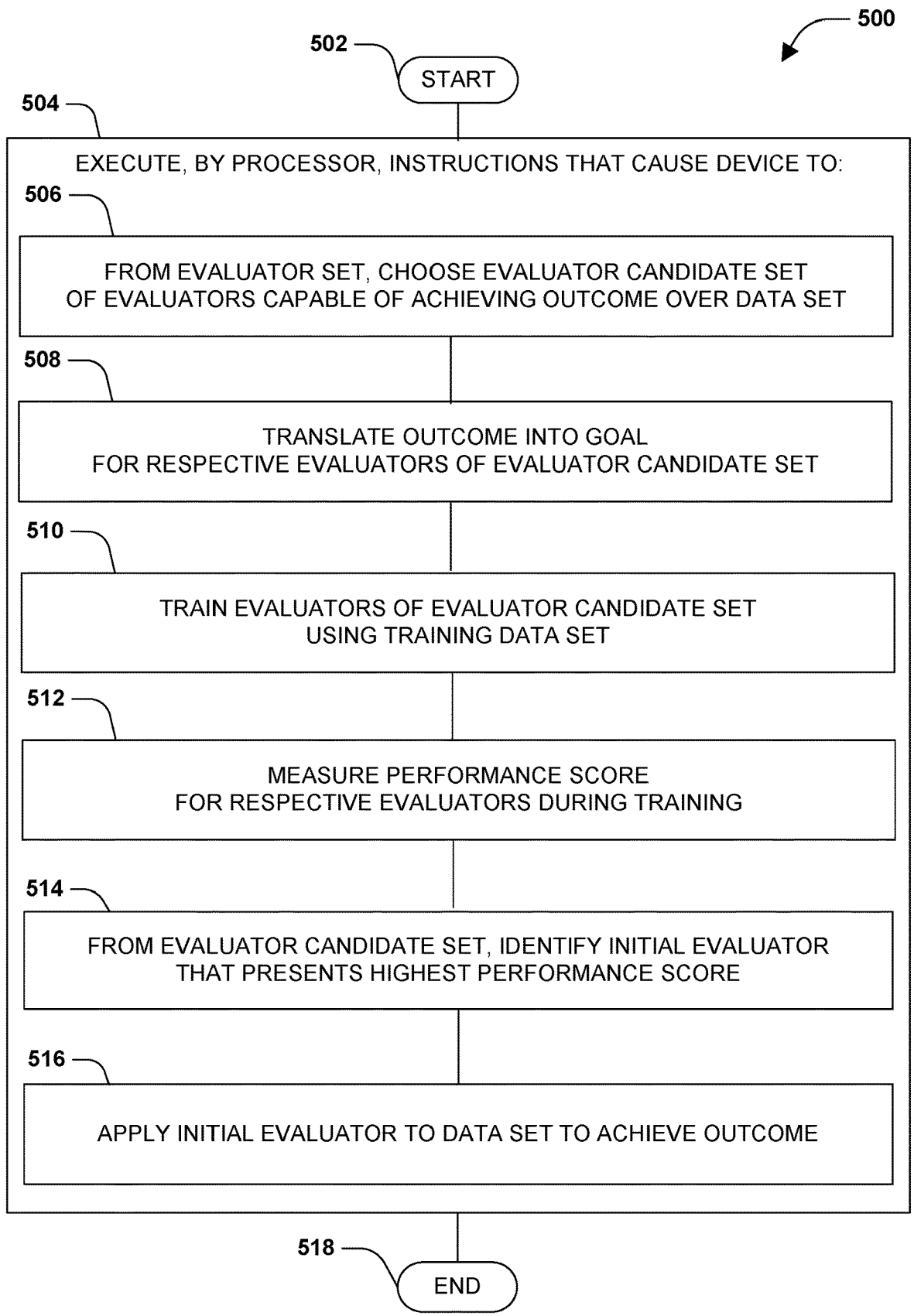
FIG. 5 is an example method of applying a goal over a data set using a set of evaluators, in accordance with the techniques presented herein.

FIG. 5 is an illustration of an example method 500 of achieving an outcome 204 over a data set 108 in accordance with the techniques presented herein. The example method 500 may be implemented, e.g., as a set of instructions stored in a memory component of a device 402, such as a memory circuit, a platter of a hard disk drive, a solid-state storage device, or a magnetic or optical disc, and organized such that, when executed on a processor 404 of the device 402, cause the device 402 to operate according to the techniques presented herein.

The example method 500 begins at 502 and involves executing 504 the instructions on a processor 404 of the device 402. Specifically, executing 504 the instructions on the processor 404 causes the device 402 to, from the evaluator set, choose 506 an evaluator candidate set 210 of evaluators 104 that are capable of achieving the outcome 204 over the data set 108. Executing 504 the instructions further causes the device to translate 508 the outcome into a goal 110 for respective evaluators 104 of the evaluator candidate set 210. Executing 504 the instructions further causes the device 402 to train 510 the evaluators 104 of the evaluator candidate set 210 using a training data set 114. Executing 504 the instructions further causes the device 402 to measure 512 a performance score for the respective evaluators 104 during the training 212. Executing 504 the instructions further causes the device 402 to, from the evaluator candidate set, identify 514 an initial evaluator 214 that exhibits a highest performance score. Executing 504 the instructions further causes the device 402 to apply 516 the initial evaluator 214 to the data set 108 to achieve the outcome 204. Having generated and applied an initial evaluator 214 to the data set 108, the example method 500 achieves the outcome 204 over the data set 108 in accordance with the techniques presented herein, and so ends at 518.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
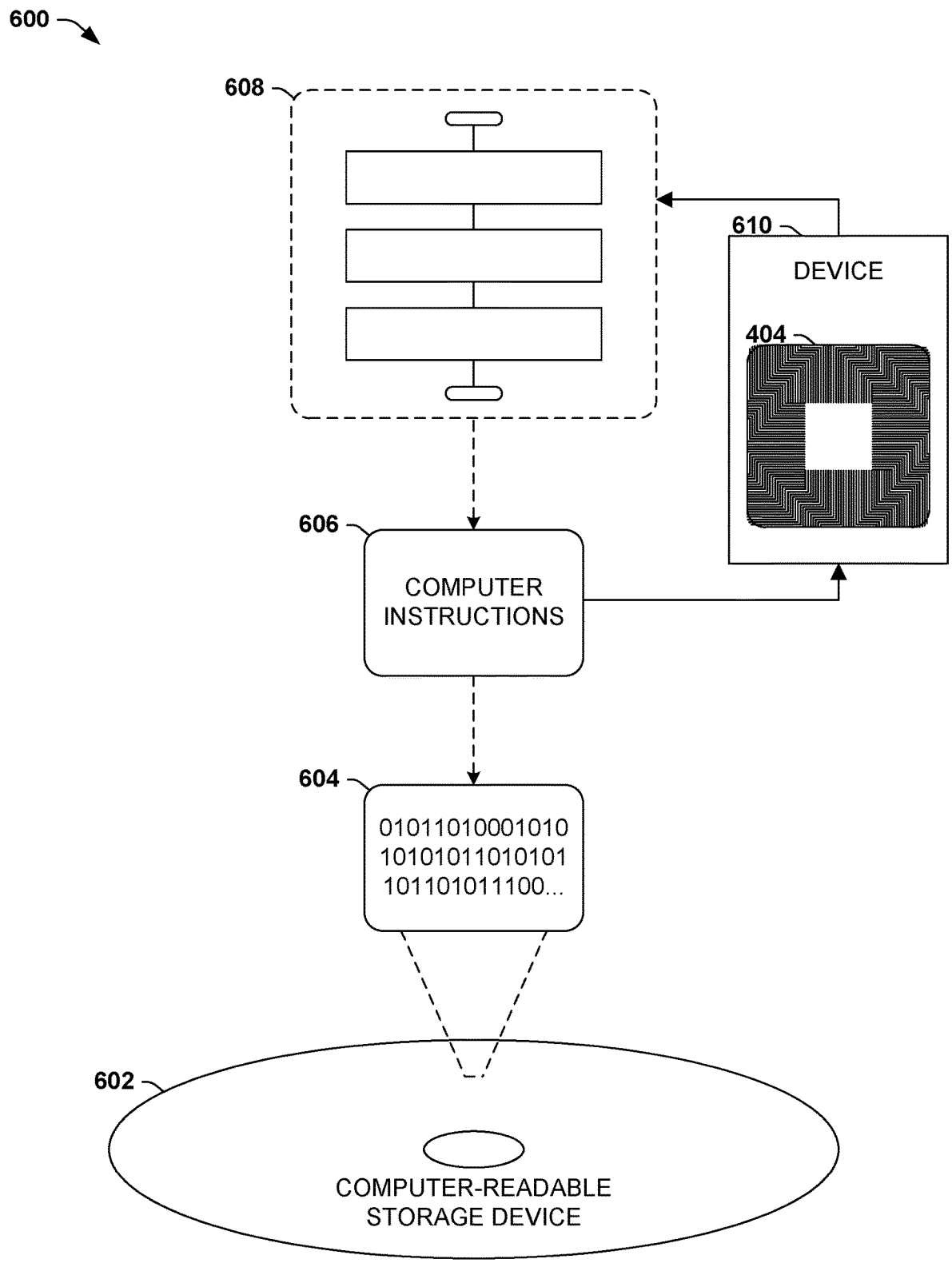
FIG. 6 is an illustration of an example computer-readable storage device storing instructions that cause a device to apply a goal over a data set using a set of evaluators, in accordance with the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 608 of a device 610, cause the device 610 to operate according to the principles set forth herein. In a first such embodiment, the processor-executable instructions 606 may comprise a portion of a device that achieves an outcome 204 over a data set 108, such as the example device 402 and/or the example system 408 of FIG. 4. In a second such embodiment, the processor-executable instructions 606 of the computer-readable storage device 602 may provide a method of achieving an outcome 204 over a data set 108, such as the example method 500 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example device 402 and/or the example system 408 of FIG. 4; the example method 500 of FIG. 5; and/or the example computer-readable storage device 602 of FIG. 6) to confer individual and/or synergistic advantages upon such embodiments.

E1. Scenarios

A first aspect that may vary among embodiments of the techniques presented herein involves the scenarios wherein such techniques may be utilized.

As a first variation of this first aspect, the techniques presented herein may be utilized with a variety of devices, such as workstations; laptops; tablets; mobile phones; game consoles and portable gaming devices; portable or non-portable media players; media display devices such as televisions, appliances; home appliance and automation devices; and computing components integrated with a wearable device integrating such as eyewear or a watch. The techniques may also be utilized in a set of devices organized as an architecture, such as a server/client or peer-to-peer configuration of two or more devices communicating directly and/or over a network. As one such example, one or more devices may receive a data set and/or a request from a user 202 submitted over a network, and providing data analysis results (e.g., the output of an evaluator) to the user 202 over the network. Alternatively, a selected and optionally trained evaluator may be delivered to the user 202 for local execution on a device of the user 202 over a data set stored by the user 202. As another such example, one or more devices may perform such evaluation over a collocated data set, over a data set that is provided by the user 202 along with the request, and/or over a data set that is remotely stored and remotely accessed. Such variations may enable the provision of data evaluation as a service that may be available in the cloud, e.g., a service that executes on a first server and that evaluates a data set that is stored by the same or a different service, which may alleviate the user 202 from the tasks of locally storing the data set and/or the evaluators.

As a second variation of this first aspect, the techniques presented herein may be utilized to evaluate various types of data sets 108. As a first such example, the data sets 108 may represent, e.g., various pieces of data within the computing environment; various elements of a system, such as a machine or a manufacturing process; various readings of sensors, such as environmental readings from weather or environmental satellites; and various real-world entitles or objects, such as people, companies, or physical items. As a second such example, the data set 108 may be organized in various ways, e.g., as files in file system; as records in a database; and/or as objects in an object graph. As a third such example, the data set 108 may be stored on the device 402 that performs the evaluation; may be distributed over a set of such devices 402; and/or may be stored remotely and accessed by the device 402 that performs the evaluation. Similarly, the evaluation using the evaluators 104 may be performed by one device and/or multiple devices, e.g., in a peer-to-peer and/or hierarchical organization. As a fourth such example, the data set 108 may be provided by a user 202 along with the outcome 204 to be achieved thereover, optionally including a schema that provides context for the data set 108. Alternatively, the data evaluation service 206 may be provided as an extension of an existing data set 108, and may utilized a pre-established schema that may inform the analysis thereof.

As a third variation of this first aspect, the techniques presented herein may be utilized to achieve various outcomes 204 over various types of data sets 108. For example, the outcome 204 over the data set 108 may be selected from an outcome set comprising: classifying the data set 108; ranking the data set 108 according to various criteria; performing a regression over the data set; performing a prediction based on the data set 108, such as the result of a trend; evaluating a search space represented by the data set 108; and recognizing a pattern in the data set 108, either a known pattern that the user 202 wishes to have recognized (e.g., recognizing objects in images according to characteristic shapes and/or colors) or an unknown pattern that the user 202 wishes to identify and study (e.g., identifying correlations in a medical study). The respective evaluators 104 of the evaluator set 102 may exhibit a capability that achieve one or more of the outcomes 204 of the goal set, and the selection of the evaluator candidate set 210 for a particular data set 108 may involve choosing the evaluators 104 from the evaluator set 102 that respectively exhibit a capability of achieving the outcome 204 over the data set 108. The outcome 204 may be specified as a basic result to be achieved, such as identifying a pattern or a route through a set of nodes. Alternatively, the outcome 204 may be specified as some advantageous properties to be pursued and/or preferred while achieving the result, such as presenting a highest-quality solution through various measurements; presenting a valid solution as quickly as possible; identifying results that satisfy a particular set of conditions; exhaustively evaluating all possible options, or economizing processing by considering only a favorable subset of options; and reducing error as measurable in various ways.

As a fourth variation of this first aspect, a variety of evaluators 104 may be applied to achieve an outcome 204 over a data set 108. Such evaluators 104 include, e.g.: artificial neural networks; Bayesian statistical classifiers; genetic algorithms; decision trees; expert systems; linear, Poisson, and ordinary least squares regression; linear support machines; random forests; stochastic gradient descent; linguistic analysis; machine vision techniques; state searches; heuristic algorithms; and fuzzy logic classifiers. Many such scenarios may be identified in which the techniques presented herein may be advantageously utilized.

E2. Selection of Initial Evaluator

A second aspect that may vary among embodiments of the techniques presented herein involves the training and evaluation the evaluator candidate set 210 to choose an initial evaluator 214 from among the evaluators 104 of the evaluator set 102.

As a first variation of this second aspect, the data set 108 and an outcome 204 may be received from a user 202, and the respective evaluators 104 of the evaluator set 102 may exhibit a capability that is capable of achieving the outcome 204 over the data set 108. For example, some evaluators 104 may be capable of performing classification of items in the data set 108; some evaluators 104 may be capable of comparing items in the data set 108 to identify a selected item, such as a ranking or search outcome 204; and some evaluators 104 may be capable of recognizing patterns within the items of a data set 108, such as recognizing shapes in an image, recognizing trends in a data set, or recognizing patterns among a series of items in the data set 108. In order to identify the evaluator candidate set 210, the outcome 204 provided by the user 202 is translated for respective evaluators 104 into a goal 110 that the evaluator 104 is capable of achieving over the data set 108, based on the evaluative techniques and properties that the respective evaluators 104 utilize.

Figure 7:
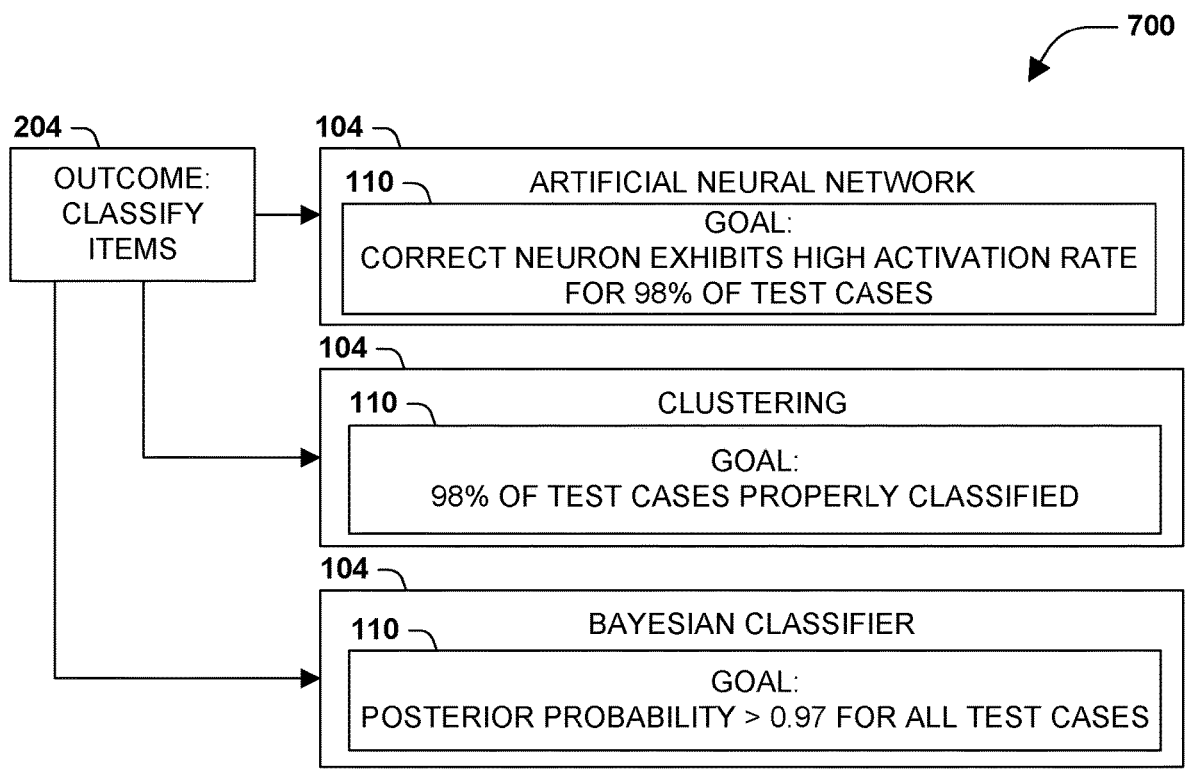
FIG. 7 is an illustration of an example scenario involving a translation of outcomes over a data set into goals for respective candidate evaluators, in accordance with the techniques presented herein.
Figure 7:
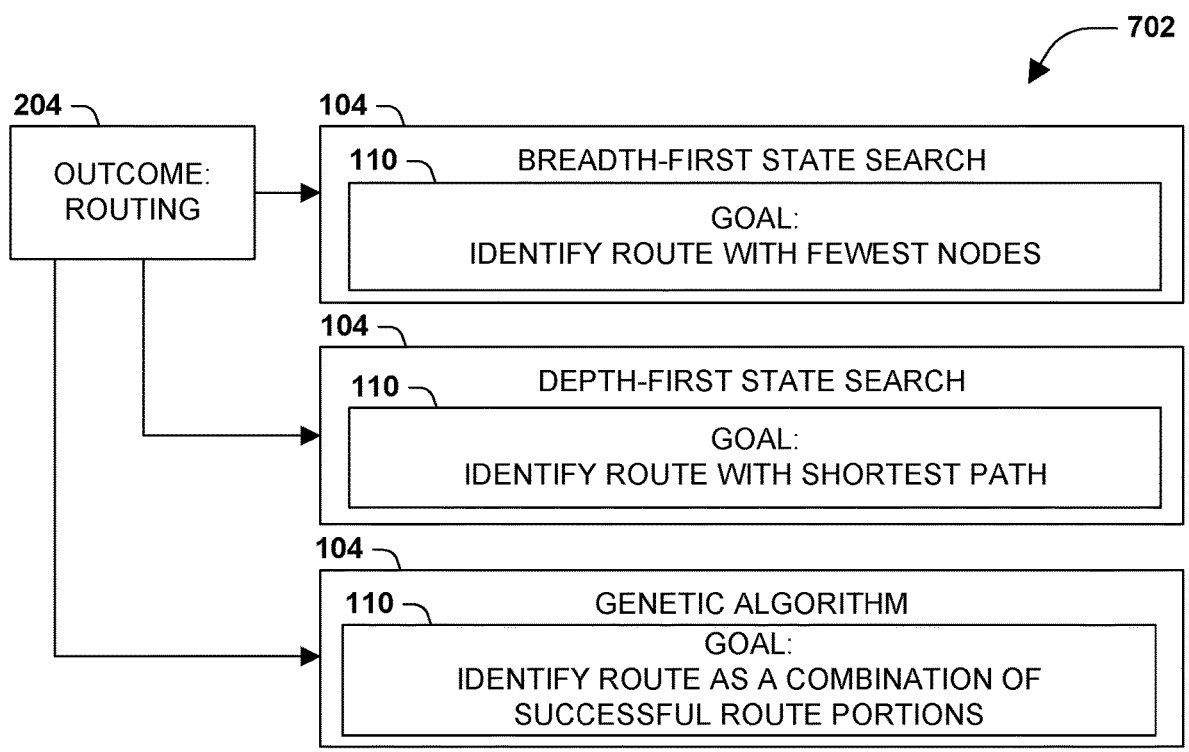

FIG. 7 is an illustration of some example scenarios in which an outcome 204 to be achieved over a data set 108 is translated into a set of goals 110 for respective evaluators 104.

In a first example scenario 700 of FIG. 7, the outcome 204 may be a request to classify items in a data set 108 with a high degree of accuracy. In such scenarios, accuracy may be measured in various ways, and different evaluators 104 may be capable of achieving different kinds of accuracy in the classification. Accordingly, for respective evaluators 104, the outcome 204 requested by the user 202 may be translated into a goal 110 that reflects the success of the evaluator 104 in achieving the outcome 204 over a data set 108.

A first evaluator 104 may comprise an artificial neural network, wherein a set of neurons is interconnected according to various weights, and the provision of an item results in the activation of one or more output layer neurons that indicates a classification of the item. For this evaluator 104, the goal 110 that reflects the outcome 204 may be identified as the activation of a correct output neuron with a high activation rate among the output neurons for at least 98% of test cases in the training data set 114. This evaluator 104 may exhibit a high individual accuracy, but may produce an incorrect output layer neuron response for anomalous cases, such as multiple output neurons being activated at the same time.

A second evaluator 104 may comprise a clustering technique that endeavors to group test cases in the training data set 114 into various classification groups according to feature similarity. For this evaluator 104, the goal 110 that reflects the outcome 204 may be identified as at least 98% of the test cases in the training data set 114 being properly assigned to a classification that matches the classifications specified in the training data set 114. This evaluator 104 may be quite accurate at grouping items that are similar to known items and classifications, but may have difficulty classifying a new item that is quite dissimilar than any of the items upon which the clustering technique was trained.

A third evaluator 104 may comprise a Bayesian statistical classifier that classifies items by determining the degree to which respective characteristics of the items in the training data set 114 determine the classification thereof (e.g., which trait most strongly indicates that a particular item belongs in a particular classification), and that calculates classification based on the posterior probability that an item with particular traits belongs in a particular class. For this evaluator 104, the goal 110 that reflects the outcome 204 may be identified as a degree of confidence in the correct classification of the items of the training data set 114, such as achieving a posterior probability of correctly classifying all such items that is above a probability threshold. This evaluator 104 may be advantageous for providing a confidence measure of the classifications, and for identifying related sets of traits that contribute to proper classification, but may be more difficult to adapt to fluctuating input and inaccuracies such as noise. Thus, while each evaluator 104 in this first example scenario 700 achieves the outcome 204 of classifying the items of the data set 108, the evaluators 104 may do so in different ways that reflect the distinct techniques embodied therein.

In a second example scenario 702 of FIG. 7, the outcome 204 may be a request to identify routes through a set of states or paths, such as mapping routes through a transportation system; evaluating options for routing configurations of a network; and evaluating a path around obstacles in an environment. Again, a set of evaluators 104 is provided that may achieve the identification of routes in accordance with the outcome 204, but may do so using different goals 110 that produce routes with different characteristics.

A first evaluator 104 involves a breadth-first state search, wherein respective steps from a starting point of the route are incrementally advanced until a route is found. The goal 110 of this evaluator 104 may be identifying routes that involve the fewest nodes between the starting point and the destination. This evaluator 104 may identify simple routes in an expedient manner, but such routes may be poorly optimized for traits such as distance.

A second evaluator 104 involves a depth-first state search, wherein a first option for traversing from a starting point of the route is evaluated exhaustively before considering a second option. The goal 110 of this evaluator 104 may be identifying routes that involve a shortest distance, wherein a first route featuring a large number of small paths may be desirable over a second route involving a small number of long and more indirect paths. While this evaluator 104 may produce routes that are well-optimized for distance, the evaluator 104 may involve a time-consuming exhaustive search, which may be difficult to scale to meet high demand and/or may not be feasible for data sets 108 with a large number of interconnected nodes.

A third evaluator 104 involves a genetic algorithm that identifies routes based on portions of other routes that have previously been found advantageous (e.g., a shortcut that may be advantageously incorporated in many routes through a particular area), and may identify the route between a particular starting location and a particular destination as a combination of route portions that have previously been found to be successful. While this evaluator 104 may exhibit a strong degree of adaptation and learning that facilitates and expedites future routing, the evaluator 104 may also gravitate toward a consensus that is overused in many cases, and may overlook some options that produce more desirable routes in a small number of circumstances. Thus, while each evaluator 104 in this second example scenario 702 achieves the outcome 204 of identifying routes within the topologies provided in the data set 108, the evaluators 104 may do so in different ways that reflect the distinct techniques embodied therein.

In each example scenario, it may be appreciated that the outcome 204 of classifying items in the data set 108 may be defined in various ways that are exhibited by distinct techniques, where some definitions and techniques are more advantageous for some problems, inquiries, data sets 108, and/or outcomes 204 than other definitions and techniques. A user 202 who is familiar with data analysis may specifically define the accuracy to be achieved. However, other users 202 may simply request an accurate classification that adheres closely to a training data set 114, and the competitive training 212 may enable each evaluator 104 to pursue a particular goal 110 that reflects the manner in which the evaluator 104 achieves the outcome 204 over the data set 108. The user 202 may be further provided with information about how each evaluator 104 responds to particular types of training data sets 210 (e.g., how each evaluator 104 handles the introduction of new, anomalous, and/or incorrect data), either by a presentation of a qualitative description of the capabilities of each such evaluator 104 or by demonstrating the results of different types of training 212.

In view of these considerations, many variations may be incorporated in the selection of the evaluator candidate set 210 and the translation of the outcome 204 into a set of goals 110 for the respective evaluators 104.

As a first variation of this second aspect, the selection of the evaluator candidate set 210 may further involve presenting an outcome set of outcomes 204 that the user 202 may wish to pursue. For instance, when presented with a data set 108 comprising a set of interconnected states, a data evaluation service 206 may offer to classify the states; to identify routes among the states; and/or to find states matching particular criteria. Moreover, for a particular outcome 204, the data evaluation service 206 may present variations on the outcome 204, such as finding routes with the shortest distance, the fewest number of nodes, and/or combinations of high-performing route portions. For example, after the user 202 selects an outcome 204 to be achieved over the date set 108, the data evaluation service 206 may present to the user the respective goals that translate the outcome 204 to respective evaluators 104. On condition of receiving, from the user 202, a selection of at least one selected goal 110 to achieve the outcome 204 over the data set 108, the data evaluation service 206 may choosing evaluators 104 from the evaluator set 102 that are associated with the at least one selected goals 110.

As a second variation of this second aspect, the respective evaluators 104 may comprise an evaluator parameter set comprising at least one evaluator parameter. For example, an evaluator 104 that utilizes an artificial neural network may be parameterized according to a number of layers, a number of neurons in each layer, and an interconnection of the layers of neurons. Choosing the evaluator candidate set 210 may further involve, for a selected evaluator 104, generating at least two instances of the selected evaluator 104 with different sets of evaluator parameters (e.g., different configurations of an artificial neural network model), and adding the multiple instances of the selected evaluator 104 to the evaluator candidate set 210. Many such techniques may be utilized to identify the evaluator candidate set 210 in accordance with the techniques presented herein.

E3. Competitive Training of Evaluator Candidate Set

A third aspect that may vary among embodiments of the techniques presented herein involves the competitive training 212 of the evaluator candidate set 210 to identify an initial evaluator 214 to be applied to the data set 108.

Figure 8:
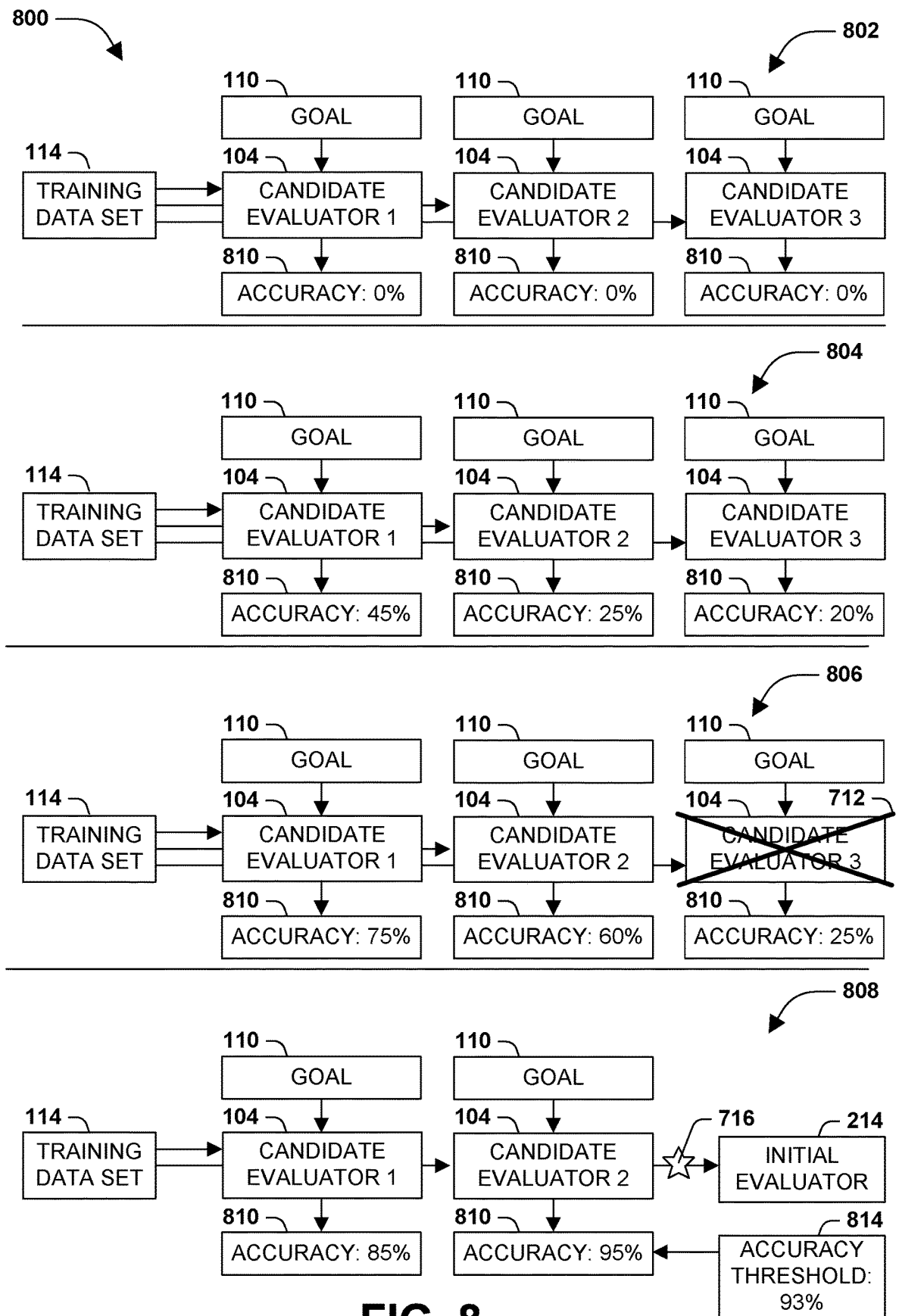
FIG. 8 is an illustration of an example scenario involving a competitive training of an evaluator candidate set, in accordance with the techniques presented herein.

FIG. 8 is an illustration of an example scenario 800 featuring an example of competitive training 212 that may be utilized in the techniques presented herein. In this example scenario 800, at a first time 802, a set of candidate evaluators 104 has been selected to achieve an outcome 204 over a data set 108, where the outcome 204 has been translated into a goal 110 for the respective candidate evaluators 104. The candidate evaluators 104 may begin in an untrained state (e.g., with the statistical weights of an artificial neural network set to random values, and/or the posterior probabilities of a Bayesian naïve classifier initially set to zero). A training data set 114 may be provided to the evaluators 104, and the performance scores 810 of the respective evaluators 104 in the competitive training 212 may be monitored. At a second time 804, the performance scores 810 of two candidate evaluators 104 may be encouraging, while the performance score 810 of a third candidate evaluator 104 may lag behind. If the performance score 810 of the third candidate evaluator 104 has not significantly improved by a third time 806 while the other candidate evaluators 120 demonstrate continued progress, the competitive training 212 may eliminate 812 the third candidate evaluator 104 as an unsuitable choice for achieving the outcome 204 over the data set 108. At a fourth time 808, the performance score 810 of the first candidate evaluator 104 may have plateaued while the performance of the second candidate evaluator 104 satisfies a performance score threshold 814, resulting in the second candidate evaluator 104 being selected as the initial evaluator 214 of the data set 108. In this manner, competitive training 212 may be utilized to test multiple candidate evaluators 104 in a concurrent manner to identify an initial evaluator 214 that is capable of achieving the outcome 204 over the data set 108.

In view of these considerations, many variations may be incorporated in the competitive training 212 of the evaluator candidate set 210 to identify the initial evaluator 214 for application 216 to the data set 108.

As a first variation of this third aspect, training the respective evaluators 104 of the evaluator candidate set 210 may further involve identifying an evaluator 104 that is exhibiting a performance score 810 below other evaluators 104 of the evaluator candidate set 210 (e.g., an evaluator 104 that is not converging as quickly or as consistently as other evaluators 104). Before training is concluded, the evaluator selector 412 may eliminate 812 the identified evaluator 104 from the evaluator candidate set 210.

As a second variation of this third aspect, measuring the performance scores 122 of the respective evaluators 104 may further involve, while training the evaluators 104 of the evaluator candidate set 210, comparing the performance scores 810 of the evaluators 104 with a performance score threshold 814 (e.g., a minimum performance score 122 that represents an acceptable evaluator 104, such as a target accuracy and/or confidence level). The training may be concluded upon identifying a selected evaluator 104 that exhibits a performance score 122 above the performance score threshold.

As a third variation of this third aspect, measuring the performance scores 810 of the respective evaluators 104 may further involve, while training the evaluators 104 of the evaluator candidate set 210, mutually comparing the performance scores 810 of the respective evaluators 104, and concluding the training on condition of identifying a selected evaluator 104 that exhibits a performance score 810 that exceeds the performance scores 810 of other evaluators 104 of the evaluator candidate set 210 (e.g., determining that one evaluator 104 has significantly surpassed the other evaluators 104 in terms of performance). This variation may be advantageous, e.g., to provide a successful conclusion to the competitive training 212 if the performance score threshold 814 has been set too high; if the candidate evaluators 104 fail to converge, or fail to converge within a reasonable time frame; and/or if the training data set 114 is too inconsistent and/or noisy to enable highly accurate determinations (e.g., a particular data item of the training data set 114 may be inadvertently included twice with mutually exclusive "correct" classifications).

As a fourth variation of this third aspect, as the respective evaluators 104 are applied to the training data set during the training (as well as the data set 108 during the actual evaluation), the evaluation results 126 may exhibit a number of desirable properties.

As a first such example, the evaluation results 126 may exhibit varying degrees of precision (e.g., producing accurate evaluation results 126 that meet the goal 110).

As a second such example, the evaluation results 126 may exhibit varying degrees of recall (e.g., producing a comprehensive set of evaluation results 126 that meet the goal 110).

As a third such example, the evaluation results 126 may exhibit varying degrees of consistency (i.e., coherence of the evaluation results 126 compared with one another).

As a fourth such example, the evaluation results 126 may exhibit varying degrees of consolidation (i.e., reduction of standard deviation).

As a fifth such example, the evaluation results 126 may exhibit varying degrees of reduction of false positives (e.g., refraining from producing evaluation results 126 that should not have been produced for particular input).

As a sixth such example, the evaluation results 126 may exhibit varying degrees of reduction of false negatives (e.g., refraining from not producing an evaluation result 126 that should have been produced for particular input).

As a seventh such example, the evaluation results 126 may exhibit varying degrees of generalization (e.g., extending principles such as classification that are exhibited by the training data set 114 to new and different data presented in the data set 108).

As a eighth such example, the evaluation results 126 may exhibit varying degrees of and economy (e.g., the reduction of time and/or computational resources in producing evaluation results 126).

These properties may represent different ways of evaluating the performance of an evaluator 104, both over the training data set 114 and as the evaluation results 126 of applying the goal 110 over the data set 108. Accordingly, in some scenarios, the performance scores 810 of the respective candidate evaluators 104 may be selected from a set of performance score characteristics, such as an evaluation precision of evaluation results 126; an evaluation recall of evaluation results 126; and an evaluation consolidation of evaluation results 126. The performance scores 810 of the respective evaluators 104 may be measured using one or more of the performance score characteristics identified for the outcome 204 over the data set 108. As one example, such performance score characteristics may be received from a user (e.g., by querying the user as to the priorities of the respective performance score characteristics, and/or presenting various characteristics to the user for selection). That is, the data evaluation service 206 may receive, from a user 202, a selection of a selected performance score characteristic for the outcome 204 over the data set 108, and accordingly measure the performance scores 122 of the respective evaluators 104 using the selected performance score characteristic.

As a fifth variation of this third aspect, several performance score characteristics may be reported for a particular evaluator 104 and evaluation, and/or rolled up using a weighted aggregation into a single performance score 122 representing multiple performance score characteristics. For example, the performance score 122 may be selected from a set of at least two performance score characteristics, and the measurement of the performance scores 122 for the respective evaluators 104 by measuring respective performance score characteristics, and calculating the performance score 122 as a linear combination of the individual performance score characteristics.

As a sixth variation of this third aspect, the initial evaluator 214 may be selected as an ensemble of two or more evaluators 104 of the evaluator candidate set 210 that exhibit comparatively high performance scores 122. That is, the outcome of the competitive training 212 of the evaluator candidate set 210 may involve identifying at least two selected evaluators 104 that each exhibits a high performance score 122 (e.g., for different portions of the training data set 114), and generating, as the initial evaluator 214, an ensemble of the at least two selected evaluators 104. The ensemble may be generated, e.g., as a sequence of the selected evaluator 104 (e.g., where a first selected evaluator 104 feeds evaluation results 126 into a second selected evaluator 104 for further processing); as a linear combination (e.g., each selected evaluator 104 may be applied to the data set 108, and the evaluation results 126 of the individual selected evaluators 104 for each instance of output may be aggregated using weights to produce the evaluation result 126 of the ensemble); as alternatives (e.g., the evaluation results 126 of the ensemble for the data set 108 may specify the individual evaluation results 126 of the individual selected evaluators 104); and/or as alternative selection (e.g., the evaluation results 126 of the ensemble for the data set 108 may specify the evaluation result 126 of a first selected evaluator 104 in some circumstances, and the evaluation result 126 of a second selected evaluator 104 in other circumstances).

E4. Application, Monitoring, and Substitute Evaluators

A fourth aspect that may vary among embodiments of the techniques presented herein involves the application 216 of the initial evaluator 214 to the data set 108 to produce evaluation results 126; the monitoring of the application 216 to detect performance drift 130 of the initial evaluator 214; and a reevaluation of the evaluator candidate set 210 to identify a substitute evaluator 218 to replace the initial evaluator 214 in the event of drift 130.

As a first variation of this fourth aspect, the data evaluation service 206 may monitor the performance of the initial evaluator 214 during application 216 to the data set 108 as a performance score 122, and may detect drift 130 by detecting that the performance score exhibited by the initial evaluator 214 has been diminished below a performance score threshold (e.g., the same performance score threshold that the initial evaluator 214 successfully exceeded to earn designation from the evaluator candidate set 210 as the initial evaluator 214). Alternatively or additionally, the data evaluation service 206 may detect drift 130 as detecting that the performance score 122 exhibited by the initial evaluator 214 is below the performance scores of at least one other evaluator 104 of the evaluator candidate set 210.

As a second variation of this fourth aspect, after identifying the initial evaluator 214, the data evaluation service 206 may continue the training of at least one other evaluator 104 of the evaluator candidate set 210. This continued training may reveal that other evaluators 104, with more extensive training periods, are more capable than the initial evaluator 214, which may aid the replacement of the initial evaluator 214 (e.g., where other evaluators 104 of the evaluator candidate set 210, besides the initial evaluator 214, have demonstrated proficiency at achieving the goal 110 over the data set 108).

As a third variation of this fourth aspect, the data evaluation service 206 may monitor a performance of the initial evaluator 214 compared with the goal. Through such monitoring, the data evaluation service 206 may identify a drift 130 of the performance of the initial evaluator 214 when applied to the data set 108, such as an emergent failure to achieve the outcome 204 over the data set 108 within a degree of accuracy and/or tolerance.

Figure 9:
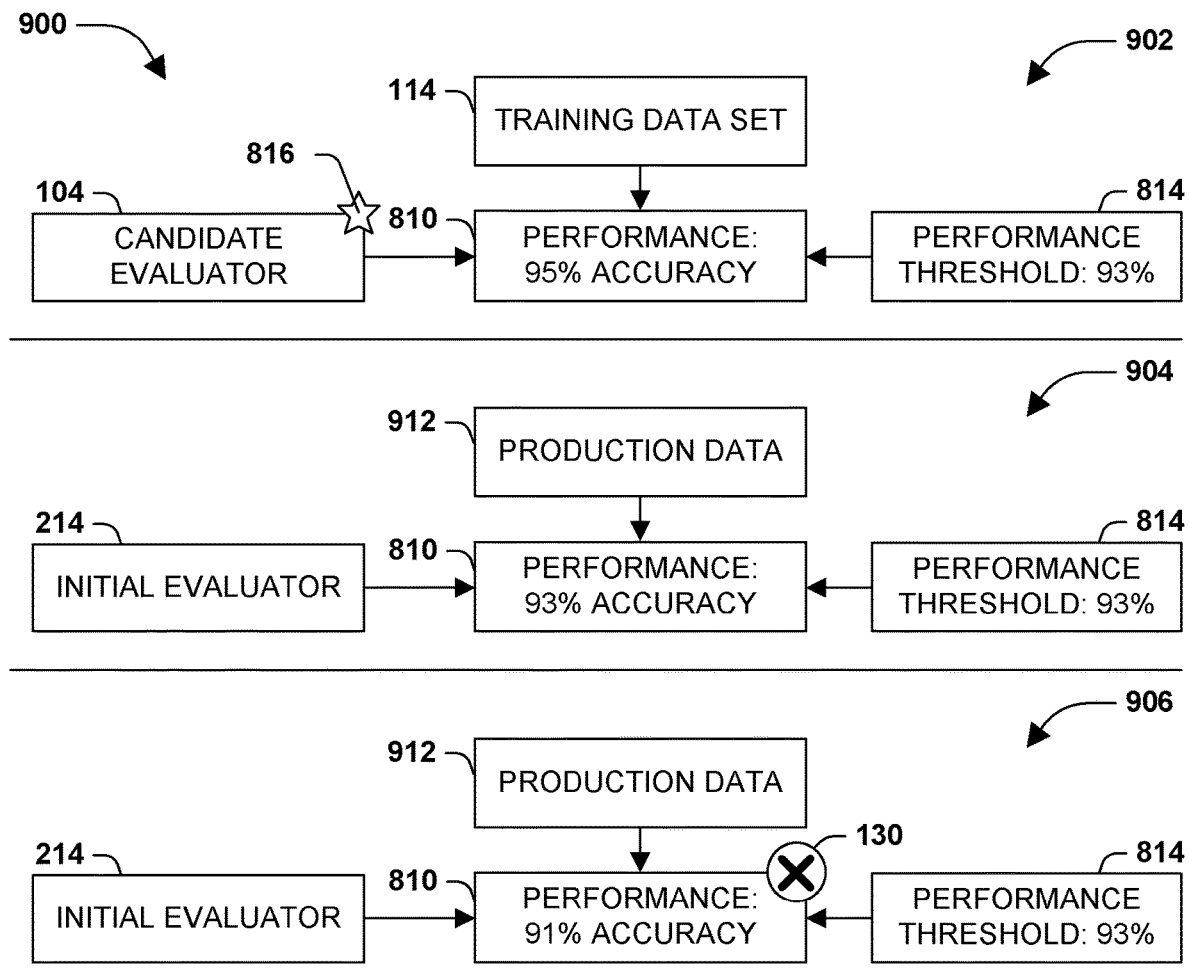
FIG. 9 is an illustration of an example scenario involving a detection of a performance drift of an initial evaluator during application to a data set, in accordance with the techniques presented herein.

FIG. 9 is an illustration of an example scenario 900 featuring further variations of this fourth aspect that involve a detection of performance drift 130 that may be exhibited by an initial evaluator 214. In this example scenario 900, at a first time 902 during competitive training 212, the initial evaluator 214 may exhibit a high performance score 810 in pursuing a goal 110 over the training data set 114 that satisfies a performance score threshold 814, and on this basis of such satisfaction, the evaluator 104 may be selected 816 as the initial evaluator 214. At a second time 904, the candidate evaluator 104 may then be included in an application 216 to production data 908, which may differ to a certain extent from the training data set 114. For example, in a classification scenario, the training data set 114 may have been curated to represent archetypal data items that neatly fit into classifications, but items in production data 908 may exhibit greater ambiguity, and/or may represent novel combinations of properties that the initial evaluator 214 has not been adequately trained to classify. Accordingly, the performance score 810 may diminish toward a performance score threshold 814. For example, monitoring of the outcome 204 achieved by the initial evaluator 214 may exhibit some deficiencies, such as poor user satisfaction, reduced confidence and/or poor consistency of the output of the initial evaluator 214 for various items of the production data 908. Diminishing performance scores 810 may also arise, e.g., due to fluctuation of the standards by which the initial evaluator 214 is determined (e.g., the provision of new ways to evaluate the achievement of the outcome 204 over the data set 108), and/or continued training of the initial evaluator 214 that causes divergence, rather than continued convergence, between actual output and desired output. At a third time 906, the performance score 810 of the initial evaluator 214 may no longer satisfy the performance threshold 814. The data evaluation service 206 may identify this occurrence as a performance drift 130 of the initial evaluator 214 as compared with the performance score threshold 814 upon which the candidate evaluator 104 was selected as the initial evaluator 214 for application 216 to the data set 108.

Other techniques may be utilized to detect a performance drift 130 of the initial evaluator 214. As a first such example, the performance drift 130 may be detected as a relative loss of performance relative to the performance score 810 that satisfied the performance score threshold 814 during the competitive training 212 (e.g., exhibiting 10% poorer accuracy). As a second such example, the performance drift 130 may be detected as an amount of time to complete a calculation (e.g., recurrent artificial neural networks may exhibit a slower convergence and decision-making process while classifying an ambiguous item, and may therefore exhibit a protracted delay in settling on the output), which may also consume greater computational resources such as memory and/or fail to scale to meet the demand for evaluation of production data. As a third such example, the performance drift 130 may be identified as a performance score 810 that has diminished below the performance score 810 of another candidate evaluator 104 of the evaluator candidate set 210.

On condition of detecting the performance drift 130, a data evaluation service 206 may utilize a variety of techniques to mitigate the effects thereof.

As a fourth variation of this fourth aspect, the data evaluation service 206 may detect performance drift 130 of the initial evaluator 214 by identifying a data subset of the data set 108 over which the initial evaluator 214 performs below a performance score threshold 814. For example, the cause of the drift may be the presentation to the initial evaluator 214 of a new subset of data with previously unseen characteristics. In this circumstance, a substitute evaluator 218 may be identified by retraining the initial evaluator 214 over a second training data set 114 that resembles the data subset containing the new or different data, and then reevaluating the initial evaluator 214, following the retraining, as the substitute evaluator 218.

As a fifth variation of this fourth aspect, the data evaluation service 206 may retrain other evaluators 104 of the evaluator candidate set 210 over the second training data set resembling the data subset, which may reveal that a different evaluator 104 is more proficient at evaluating the new or different data. The substitute evaluator 218 may be selected as another evaluator 104 of the evaluator candidate set 210 that exhibits a performance over the data subset that is higher than the performance of the initial evaluator. Following selection of the substitute evaluator 218, the performance of the substitute evaluator 218 may also be monitored for performance drift 130, and may prompt a second instance of mitigating techniques (e.g., reverting to the initial evaluator 214, trying a second substitute evaluator 1004, and/or generating an ensemble of the initial evaluator 214 and the second evaluator 104 to serve as the substitute evaluator 218).

Figure 10:
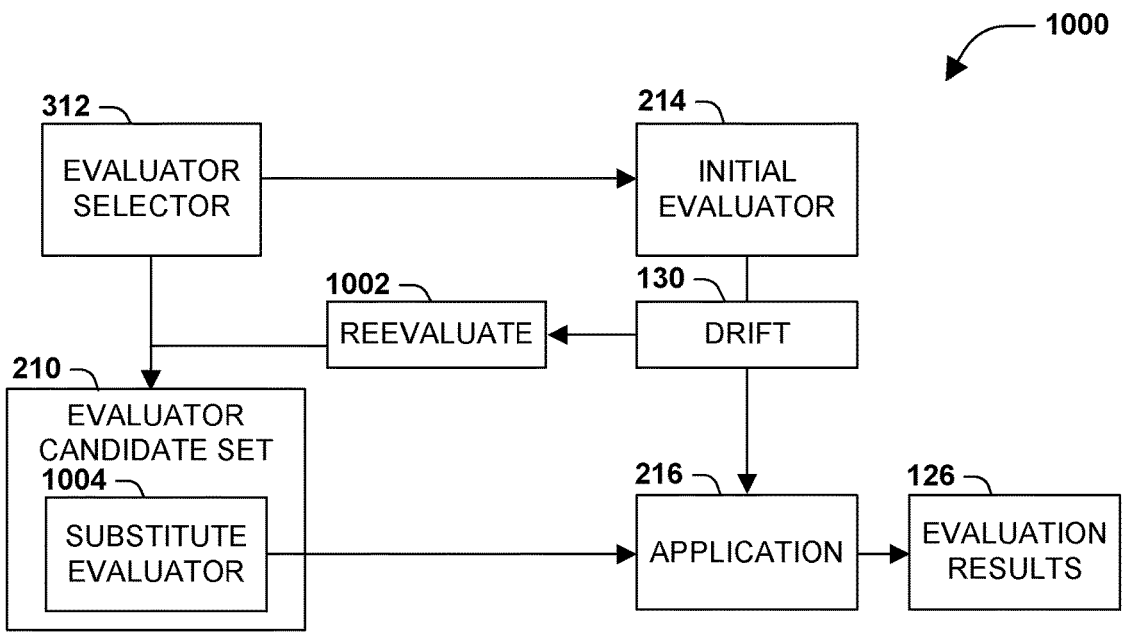
FIG. 10 is an illustration of an example scenario involving a mitigation of a performance drift of an initial evaluator during application to a data set by selecting a substitute evaluator from an evaluator candidate set, in accordance with the techniques presented herein.

FIG. 10 is an illustration of an example scenario 1000 featuring this technique, wherein an evaluator selector 412 initially selects an initial evaluator 214 for the data set 108. On condition of detecting a drift 130 of the performance of the initial evaluator 214, the evaluator selector 412 may initiate a reevaluation 1002 of the evaluator candidate set 210, and may identify a substitute evaluator 1004 of the evaluator candidate set 210 that exhibits a higher performance score 810 than the initial evaluator 214. The evaluator selector 412 may therefore select the substitute evaluator 1004 to substitute for the initial evaluator 214 in application 216 to the data set 108 in order to produce evaluation results 126 demonstrating the achievement of the outcome 204 over the data set 108 in accordance with the techniques presented herein.

As a sixth variation of this fourth aspect, a substitute evaluator 218 may be identified as an ensemble. For example, the data evaluation service 206 may detect the drift 130 of the initial evaluator 214 by identifying a data subset of the data set 108 over which the initial evaluator 214 performs below a performance threshold, and identifying the substitute evaluator 1004 as a second evaluator that exhibits a performance over the data subset that is higher than the performance of the initial evaluator. The data evaluation service 206 may therefore generate, as the substitute evaluator 1004, an ensemble comprising the second evaluator 104 that may be added to the initial evaluator 214, where the output 128 for respective inputs is an aggregation of the output of the initial evaluator 214 and the second evaluator 104. The aggregation may be achieved, e.g., as an average, weighted average, maximum or minimum, or other combination of the outputs 128 of the respective evaluators 104 of the ensemble. Many such techniques may be utilized to mitigate the performance drift 130 of an initial evaluator 214 in accordance with the techniques presented herein.

E5. Adaptive Data Evaluation

A fifth aspect that may vary among embodiments of the techniques presented herein relates to the advancement of the data evaluation service 206 by monitoring the performance of various evaluators 104 when adapted to various data sets 108 in order to identify practice techniques that promote the proficiency, accuracy, consistency, sensitivity, and/or adaptability of the data evaluation service 206.

As a first variation of this fifth aspect, when an initial evaluator 214 has been selected for a particular data set 108, its performance may be monitored over time to determine the proficiency and longevity in the application 216 of this particular evaluator 104 to this type of data set 108. Such monitoring may enable an automated identification of the suitability of the respective evaluators 104 for various types of data sets 108 and outcomes 204 achievable thereover, which may assist the future selection of the evaluator candidate set 210, the competitive training 212 thereof to select an initial evaluator 214, and/or the detection and/or mitigation of performance drift.

As a second variation of this fifth aspect, the data evaluation service 206 may be concurrently and/or consecutively applied over data sets 108 owned by different users, where such users may seek to protect the security of the data set 108 from other users of the same data evaluation service 206. The data evaluation service 206 may enforce security policies that preclude a sharing of information about any user's data from other users (e.g., that a particular evaluator 104 is being used to perform a particular evaluation of a particular data set 108, and/or that a particular evaluator 104 advantageous for performing a particular type of evaluation over particular types of data sets 108). Alternatively or additionally, the data evaluation service may more generally incorporate knowledge of the evaluation results 126 in order to improve the data evaluation service 206 on behalf of other users (e.g., a general finding that a particular evaluator 104 advantageous for performing a particular type of evaluation over some types of data sets 108 may be helpful for other users, and may be applied on behalf thereof without violating the confidence of a first user for which the evaluation was performed when the discovery was achieved). Many such variations may be utilized in the selection of the initial evaluator 214 in accordance with the techniques presented herein. Many such techniques may be utilized to advance a data evaluation service 206 by observing the application 216 of evaluators 104 to data sets 108, in accordance with the techniques presented herein.

F. Computing Environment

Figure 11:
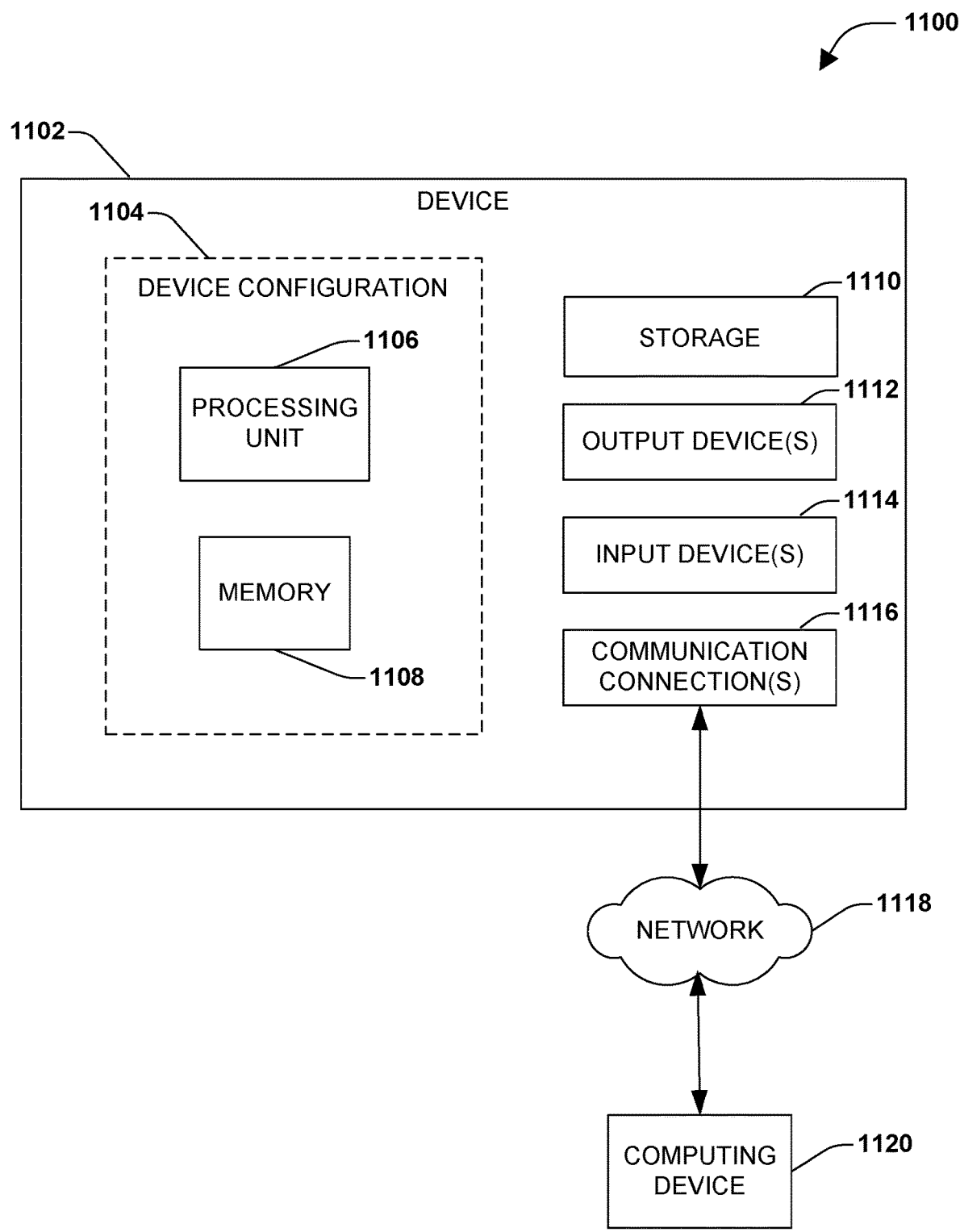
FIG. 11 is an illustration of an example computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 11 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 11 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1108 and storage 1110 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1102 may also include one or more communication connections 1116 that allow device 1102 to communicate with other devices. The one or more communication connections 1116 may include, but is not limited to, a modem, a Network Interface Card (NIC), an integrated network interface, a radio frequency transmitter/receiver, an infrared port, a USB connection, or other interfaces for connecting computing device 1102 to other computing devices. The one or more communication connections 1116 may include a wired connection or a wireless connection. The one or more communication connections 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include one or more input devices 1114 such as keyboard, mouse, pen, voice input device, touch input device, infrared cameras, video input devices, and/or any other input device. One or more output devices 1112 such as one or more displays, speakers, printers, and/or any other output device may also be included in device 1102. One or more input devices 1114 and one or more output devices 1112 may be connected to device 1102 via a wired connection, wireless connection, or any combination thereof. In one embodiment, an input device or an output device from another computing device may be used as one or more input devices 1114 or one or more output devices 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1120 accessible via network 1118 may store computer readable instructions to implement one or more embodiments provided herein. Computing device 1102 may access computing device 1120 and download a part or all of the computer readable instructions for execution. Alternatively, computing device 1102 may download pieces of the computer readable instructions, as needed, or some instructions may be executed at computing device 1102 and some at computing device 1120.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A device that achieves an outcome over a data set, the device comprising: a processor, and a memory storing:
    an evaluator set comprising at least two evaluators; and
        instructions that, when executed by the processor, cause the device to:
    from the evaluator set, choose an evaluator candidate set of evaluators that are capable of achieving the outcome over the data set;
    for each evaluator of the evaluator candidate set, translate the outcome into a respective goal, where a respective goal for one evaluator of the evaluator candidate set is different from a respective goal for at least one other evaluator of the evaluator candidate set;
    train the evaluators of the evaluator candidate set using a training data set;
    measure a performance score for each evaluator of the evaluator candidate set during the training;
    from the evaluator candidate set, identify an initial evaluator that exhibits a highest performance score; and
    apply the initial evaluator to the data set.

2. A system for achieving an outcome over a data set using an evaluator set, the system comprising:
an evaluator set comprising at least two evaluators;
an evaluator candidate set selector that:
from the evaluator set, chooses an evaluator candidate set of evaluators that are capable of achieving the outcome over the data set; and
for each evaluator of the evaluator candidate set, translates the outcome into a respective goal, where a respective goal for one evaluator of the evaluator candidate set is different from a respective goal for at least one other evaluator of the evaluator candidate set; and
an evaluator selector that:
trains the evaluators of the evaluator candidate set using a training data set;
measures a performance score for each evaluator of the evaluator candidate set during the training based on the respective goal of each evaluator;
from the evaluator set, chooses an evaluator candidate set of evaluators that are capable of fulfilling the goal;
from the evaluator candidate set, identifies an initial evaluator that exhibits a highest performance score; and
applies the initial evaluator to the data set.

3. A method of achieving an outcome over a data set using a device comprising a processor and an evaluator set, the method comprising:
executing, by the processor, instructions that cause the device to:
from the evaluator set, choose an evaluator candidate set of evaluators that are capable of achieving the outcome over the data set;
for each evaluator of the evaluator candidate set, translate the outcome into a respective goal, where a respective goal for one evaluator of the evaluator candidate set is different from a respective goal for at least one other evaluator of the evaluator candidate set;
train the evaluators of the evaluator candidate set using a training data set;
measure a performance score for each evaluator of the evaluator candidate set during the training based on the respective goal of each evaluator;
from the evaluator candidate set, identify an initial evaluator that exhibits a highest performance score; and
apply the initial evaluator to the data set to achieve the outcome.

4. The method of claim 3, wherein: the outcome is selected from an outcome set comprising:
classifying the data set;
ranking the data set;
performing a regression over the data set;
performing a prediction based on the data set;
evaluating a search space represented by the data set; and
recognizing a pattern in the data set;
respective evaluators of the evaluator set exhibit a capability that may achieve at least one outcome of the outcome set over the data set; and
choosing the evaluator candidate set for a selected outcome comprises:
from the evaluator set, choosing evaluators that respectively exhibit a capability that may achieve the selected outcome over the data set.

5. The method of claim 3, wherein:
the data set is received from a user;
and respective evaluators of the evaluator set exhibit a capability that may achieve the outcome over the data set; and
choosing the evaluator candidate set further comprises:
for respective goals that are translated from the outcome for respective evaluators, presenting the respective goals to the user;
receiving, from the user, a selection of at least one selected goal to achieve the outcome over the data set; and
from the evaluator set, choosing evaluators that are associated with the at least one selected goals.

6. The method of claim 3, wherein:
respective evaluators comprise an evaluator parameter set comprising at least one evaluator parameter; and
choosing the evaluator candidate set further comprises:
for a selected evaluator, generating at least two instances of the selected evaluator with different sets of evaluator parameters; and
adding the at least two instances of the selected evaluator to the evaluator candidate set.

7. The method of claim 3, wherein training the respective evaluators further comprises:
while training the evaluators of the evaluator candidate set, identifying an evaluator that is exhibiting a performance score below other evaluators of the evaluator candidate set; and
before concluding the training, eliminating the identified evaluator from the evaluator candidate set.

8. The method of claim 3, wherein measuring the performance score of the respective evaluators further comprises:
while training the evaluators of the evaluator candidate set, comparing the performance scores of the respective evaluators with a performance score threshold; and
concluding the training responsive to a selected evaluator exhibiting a performance score that is above the performance score threshold.

9. The method of claim 3, wherein measuring the performance score of the respective evaluators further comprises:
while training the evaluators of the evaluator candidate set, mutually comparing the performance scores of the respective evaluators; and
concluding the training responsive to a selected evaluator exhibiting a performance score that exceeds the performance scores of other evaluators of the evaluator set.

10. The method of claim 3, wherein:
the performance score is selected from a set of performance score characteristics comprising: an evaluation precision of evaluation results, an evaluation recall of evaluation results, and an evaluation consolidation of evaluation results; and
measuring the performance score for the respective evaluators further comprises:
measuring the performance score using a performance score characteristic identified for the goal over the data set.

11. The method of claim 3, wherein:
the performance score is selected from a set of performance score characteristics;
executing the instructions further causes the device to: receive, from a user, a selection of a selected performance score characteristic for the goal over the data set; and
measuring the performance score for the respective evaluators further comprises:

measuring the performance score using the selected performance score characteristic.

12. The method of claim 3, wherein:
the performance score is selected from a set of at least two performance score characteristics; and
measuring the performance score for the respective evaluators further comprises:
measuring respective performance score characteristics; and
calculating the performance score as a linear combination of the performance score characteristics.

13. The method of claim 3, wherein identifying the initial evaluator further comprises:
identifying at least two selected evaluators that each exhibits a high performance score; and
generating, as the initial evaluator, an ensemble of the at least two selected evaluators.

14. The method of claim 3, wherein executing the instructions further causes the device to:
monitor a performance of the initial evaluator compared with the respective goal of the initial evaluator; and
on condition of detecting a drift of the performance of the initial evaluator:
from the evaluator candidate set, identify a substitute evaluator; and
replace the initial evaluator with the substitute evaluator.

15. The method of claim 14, wherein: monitoring the performance of the initial evaluator further comprises:
measuring the performance exhibited by the initial evaluator as a performance score; and
detecting the drift of the performance further comprises:
detecting that the performance score exhibited by the initial evaluator being diminished below a performance score threshold.

16. The method of claim 14, wherein: monitoring the performance of the initial evaluator further comprises:
measuring the performance exhibited the initial evaluator as a performance score; and
detecting the drift of the performance further comprises:
detecting that the performance score exhibited by the initial evaluator is below the performance score of at least one other evaluator of the evaluator candidate set.

17. The method of claim 14, wherein executing the instructions further causes the device to, after identifying the initial evaluator, continuing training of at least one other evaluator of the evaluator candidate set.

18. The method of claim 14, wherein: detecting the drift of the performance further comprises:
identifying a data subset of the data set over which the initial evaluator performs below a performance threshold; and
identifying the substitute evaluator further comprising:
retraining the initial evaluator over a second training data set resembling the data subset; and
reevaluating the initial evaluator, following the retraining, as the substitute evaluator.

19. The method of claim 14, wherein: detecting the drift of the performance further comprises:
identifying a data subset of the data set over which the initial evaluator performs below a performance threshold; and
identifying the substitute evaluator further comprising:
identifying a substitute evaluator that exhibits a performance over the data subset that is higher than the performance of the initial evaluator.

20. The method of claim 14, wherein: detecting the drift of the performance further comprises:
identifying a data subset of the data set over which the initial evaluator performs below a performance threshold; and
identifying the substitute evaluator further comprising:
identifying a second evaluator that exhibits a performance over the data subset that is higher than the performance of the initial evaluator; and
generating, as the second evaluator, and ensemble evaluator that generates output for the data set based on an aggregation of: the output of the initial evaluator, and the output of the second evaluator.

* * * * *